United States Patent
Blazer et al.

(10) Patent No.: US 9,091,830 B2
(45) Date of Patent: Jul. 28, 2015

(54) BINDER FILM FOR A FIBER OPTIC CABLE

(71) Applicant: Corning Cable Systems LLC, Hickory, NC (US)

(72) Inventors: Bradley Jerome Blazer, Granite Falls, NC (US); Rodney Maurice Burns, Conover, NC (US); Julian Latelle Greenwood, III, Hickory, NC (US); Keith Aaron Greer, Morganton, NC (US); Warren Welborn McAlpine, Hickory, NC (US); William James Miller, Horseheads, NY (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 0 days.

(21) Appl. No.: 14/136,419

(22) Filed: Dec. 20, 2013

(65) Prior Publication Data
US 2015/0086168 A1 Mar. 26, 2015

Related U.S. Application Data

(63) Continuation-in-part of application No. 14/091,548, filed on Nov. 27, 2013, now Pat. No. 8,798,417, which (Continued)

(51) Int. Cl.
*G02B 6/44* (2006.01)
*B29D 11/00* (2006.01)
*B29K 23/00* (2006.01)

(52) U.S. Cl.
CPC ........ *G02B 6/4429* (2013.01); *B29D 11/00721* (2013.01); *G02B 6/4486* (2013.01);

(Continued)

(58) Field of Classification Search
CPC .... G02B 6/4494; G02B 6/441; G02B 6/4411; G02B 6/443; G02B 6/4429
USPC .................................................. 385/102, 112
See application file for complete search history.

(56) References Cited

U.S. PATENT DOCUMENTS

| 4,496,214 A | 1/1985 | Oestreich et al. .......... 350/96.23 |
| 4,515,435 A | 5/1985 | Anderson .................. 350/96.23 |

(Continued)

FOREIGN PATENT DOCUMENTS

| CN | 102023357 B | 11/2012 | ............... G02B 6/44 |
| EP | 1531352 B1 | 12/2009 | ............... G02B 6/44 |

(Continued)

OTHER PUBLICATIONS

Marik, J., "Advanced SZ Stranding Technology for Enhanced Applications," 4 pages, Last accessed on Feb. 21, 2014 from http://rosendahlaustria.com/custom/rosendahlaustria/Rosendahl_Products_PDF/1062003111324_p1_.pdf.

(Continued)

*Primary Examiner* — Jerry Blevins
(74) *Attorney, Agent, or Firm* — William D. Doyle

(57) ABSTRACT

A fiber optic cable includes a core and a binder film surrounding the core. The core includes a central strength member and core elements, such as buffer tubes containing optical fibers, where the core elements are stranded around the central strength member in a pattern of stranding including reversals in lay direction of the core elements. The binder film is in radial tension around the core such that the binder film opposes outwardly transverse deflection of the core elements.

19 Claims, 14 Drawing Sheets

Related U.S. Application Data is a continuation of application No. PCT/US2013/061133, filed on Sep. 23, 2013, which is a continuation-in-part of application No. 13/790,329, filed on Mar. 8, 2013.

(60) Provisional application No. 61/705,769, filed on Sep. 26, 2012.

(52) U.S. Cl.
CPC ......... *B29K2023/06* (2013.01); *B29K 2023/12* (2013.01); *G02B 6/441* (2013.01); *G02B 6/4411* (2013.01); *G02B 6/4434* (2013.01); *G02B 6/4494* (2013.01)

(56) References Cited

U.S. PATENT DOCUMENTS

| | | | |
|---|---|---|---|
| 4,535,098 A | 8/1985 | Evani et al. | 521/149 |
| 4,730,894 A | 3/1988 | Arroyo | 350/96.23 |
| 4,767,184 A | 8/1988 | Ogasawara et al. | 350/96.23 |
| 4,796,970 A | 1/1989 | Reeve et al. | 385/109 |
| 4,973,611 A | 11/1990 | Puder | 522/42 |
| 4,993,804 A | 2/1991 | Mayr et al. | 350/96.23 |
| 5,155,789 A | 10/1992 | Le Noane et al. | 385/106 |
| 5,157,752 A | 10/1992 | Greveling et al. | 385/112 |
| 5,173,961 A | 12/1992 | Chiasson | 385/113 |
| 5,179,611 A | 1/1993 | Umeda et al. | 385/110 |
| 5,233,678 A | 8/1993 | Katurashima et al. | 385/112 |
| 5,388,175 A | 2/1995 | Clarke | 385/100 |
| 5,440,660 A | 8/1995 | Dombrowski et al. | 385/102 |
| 5,671,312 A | 9/1997 | Jamet | 385/100 |
| 5,684,904 A | 11/1997 | Bringuier et al. | 385/109 |
| 5,703,983 A | 12/1997 | Beasley, Jr. | 385/104 |
| 6,137,936 A | 10/2000 | Fitz et al. | 385/113 |
| 6,185,352 B1 | 2/2001 | Hurley | 385/114 |
| 6,193,824 B1 | 2/2001 | Einsle et al. | 156/53 |
| 6,215,931 B1 | 4/2001 | Risch et al. | 385/109 |
| 6,304,701 B1 | 10/2001 | Bringuier et al. | 385/106 |
| 6,314,713 B1* | 11/2001 | Fitz et al. | 57/293 |
| 6,318,061 B1 | 11/2001 | Schneider et al. | 57/7 |
| 6,334,015 B2 | 12/2001 | Jamet | 385/102 |
| 6,483,971 B2 | 11/2002 | Gaillard et al. | 385/113 |
| 6,487,346 B2 | 11/2002 | Nothofer | 385/109 |
| 6,546,712 B2 | 4/2003 | Moss et al. | 57/293 |
| 6,597,844 B1 | 7/2003 | Witt et al. | 385/109 |
| 6,603,908 B2 | 8/2003 | Dallas et al. | 385/109 |
| 6,658,184 B2 | 12/2003 | Bourget et al. | 385/100 |
| 6,721,480 B1 | 4/2004 | Bocanegra et al. | 385/114 |
| 6,798,958 B2 | 9/2004 | Bourget et al. | 385/113 |
| 6,856,748 B1 | 2/2005 | Elkins, II et al. | 385/135 |
| 6,870,995 B2 | 3/2005 | Johnson et al. | 385/112 |
| 6,901,191 B2 | 5/2005 | Hurley et al. | 385/109 |
| 6,912,347 B2 | 6/2005 | Rossi et al. | 385/112 |
| 6,931,190 B2 | 8/2005 | Ino et al. | 385/128 |
| 6,937,802 B2 | 8/2005 | Jamet et al. | 385/106 |
| 6,957,000 B2 | 10/2005 | McAlpine et al. | 385/102 |
| 6,973,246 B2 | 12/2005 | Bocanegra et al. | 385/113 |
| 7,082,241 B2 | 7/2006 | Jamet et al. | 385/109 |
| 7,123,801 B2 | 10/2006 | Fitz | 385/105 |
| 7,200,307 B2 | 4/2007 | Bau' et al. | 385/111 |
| 7,212,715 B2 | 5/2007 | Dallas et al. | 385/100 |
| 7,242,830 B2 | 7/2007 | Storaasli et al. | 385/100 |
| 7,242,831 B2 | 7/2007 | Fee | 385/103 |
| 7,321,709 B2 | 1/2008 | Yokokawa et al. | 385/103 |
| 7,359,600 B2 | 4/2008 | Kim et al. | 385/113 |
| 7,373,057 B2 | 5/2008 | Pizzorno et al. | 385/109 |
| 7,391,943 B2 | 6/2008 | Blazer et al. | 385/100 |
| 7,431,963 B2 | 10/2008 | Konstadinidis et al. | 427/163.2 |
| 7,567,741 B2 | 7/2009 | Abernathy et al. | 385/113 |
| 7,570,852 B2 | 8/2009 | Nothofer et al. | 385/109 |
| 7,570,854 B2 | 8/2009 | Keller et al. | 385/110 |
| 7,630,605 B2 | 12/2009 | Bringuier et al. | 385/100 |
| 7,742,667 B2 | 6/2010 | Paschal et al. | 385/109 |
| 7,750,060 B2 | 7/2010 | Zahora et al. | 522/97 |
| 7,970,247 B2 | 6/2011 | Barker | 385/100 |
| 7,974,507 B2 | 7/2011 | Lovie et al. | 385/113 |
| 7,995,886 B2 | 8/2011 | Pizzorno et al. | 385/109 |
| 8,031,997 B2 | 10/2011 | Overton | 385/110 |
| 8,041,167 B2 | 10/2011 | Overton | 385/109 |
| 8,118,282 B2 | 2/2012 | Griffioen et al. | 254/134.4 |
| 8,165,439 B2 | 4/2012 | Overton | 385/106 |
| 8,175,434 B2 | 5/2012 | Davidson et al. | 385/113 |
| 8,180,190 B2 | 5/2012 | Bringuier et al. | 385/109 |
| 8,189,974 B2 | 5/2012 | Hashimoto et al. | 385/109 |
| 8,306,377 B2* | 11/2012 | Keller et al. | 385/109 |
| 8,355,613 B2 | 1/2013 | Weimann | 385/100 |
| 8,467,645 B2 | 6/2013 | Keller et al. | 385/104 |
| 8,467,650 B2 | 6/2013 | Overton et al. | 385/128 |
| 8,494,327 B2 | 7/2013 | Keller et al. | 385/106 |
| 8,498,509 B2 | 7/2013 | Tatat | 385/109 |
| 2003/0035635 A1 | 2/2003 | Chastain et al. | 385/112 |
| 2003/0165310 A1 | 9/2003 | Moon et al. | 385/113 |
| 2004/0252954 A1 | 12/2004 | Ginocchio et al. | 385/100 |
| 2005/0013573 A1* | 1/2005 | Lochkovic et al. | 385/128 |
| 2006/0045443 A1 | 3/2006 | Blazer | 385/114 |
| 2006/0093268 A1 | 5/2006 | Zimmel | 385/50 |
| 2006/0193575 A1* | 8/2006 | Greenwood et al. | 385/109 |
| 2008/0273845 A1 | 11/2008 | Weimann | 385/103 |
| 2009/0116797 A1 | 5/2009 | Stingl et al. | 385/103 |
| 2009/0214167 A1 | 8/2009 | Lookadoo et al. | 385/100 |
| 2009/0297104 A1 | 12/2009 | Kachmar | 385/101 |
| 2009/0317039 A1 | 12/2009 | Blazer et al. | 385/107 |
| 2010/0067856 A1 | 3/2010 | Knoch et al. | 385/111 |
| 2010/0119202 A1 | 5/2010 | Overton | 385/141 |
| 2010/0150505 A1 | 6/2010 | Testu et al. | 385/109 |
| 2010/0189399 A1 | 7/2010 | Sillard et al. | 385/126 |
| 2010/0202741 A1 | 8/2010 | Ryan et al. | 385/113 |
| 2011/0091171 A1 | 4/2011 | Tatat et al. | 385/105 |
| 2011/0110635 A1 | 5/2011 | Toge et al. | 385/102 |
| 2011/0135816 A1 | 6/2011 | Burns et al. | 427/163.2 |
| 2011/0194825 A1 | 8/2011 | Parris | 385/109 |
| 2011/0268398 A1 | 11/2011 | Quinn et al. | 385/100 |
| 2012/0063731 A1 | 3/2012 | Fitz et al. | 385/104 |
| 2012/0099825 A1 | 4/2012 | Messer | 385/113 |
| 2012/0257864 A1* | 10/2012 | Consonni et al. | 385/112 |
| 2012/0281953 A1 | 11/2012 | Choi et al. | 385/101 |
| 2013/0058614 A1 | 3/2013 | Gimblet et al. | 385/104 |

FOREIGN PATENT DOCUMENTS

| | | | | |
|---|---|---|---|---|
| EP | 1610163 B1 | 10/2011 | | G02B 6/44 |
| EP | 1982222 B1 | 6/2012 | | G02B 6/44 |
| GB | 2064163 A | 6/1981 | | G02B 5/14 |
| JP | 3137607 | 11/2007 | | A61B 6/00 |
| JP | 2010-39018 | 2/2010 | | G02B 6/44 |
| KR | 10-0288444 | 5/2001 | | G02B 6/44 |
| KR | 2001-0045604 | 6/2001 | | G02B 6/44 |
| KR | 10-1140219 B1 | 5/2012 | | G02B 6/44 |
| WO | WO01/21706 A1 | 3/2001 | | C08L 23/06 |
| WO | WO 02/099491 A1 | 12/2002 | | G02B 6/44 |
| WO | WO2006/034722 A1 | 4/2006 | | G02B 6/44 |
| WO | WO2011/137236 A1 | 11/2011 | | B29C 47/02 |
| WO | WO2012/071490 A2 | 5/2012 | | B29C 47/02 |
| WO | WO2012/071490 A3 | 5/2012 | | B29C 47/02 |
| WO | WO2013/130121 A1 | 9/2013 | | G02B 6/44 |
| WO | WO2013/172878 A1 | 11/2013 | | G02B 6/44 |

OTHER PUBLICATIONS

Nextrom, "SZ Stranding Line OFC 70," 2 pages, Last accessed on Feb. 21, 2014 from http://www.nextrom.com/877_en_SZ-Stranding-Line.aspx.

Rechberger, M., Hörschläger, W., "Buffering & SZ-Stranding Process for Compact Dry Tube FO-Cable," *Proceedings of the 56th Annual International Wire & Cable Symposium*, 2007, pp. 614-617, Last accessed on Feb. 24, 2014 from http://ecadigitallibrary.com/pdf/IWCS07/15_5.pdf.

Hogari et al., Feb. 1998, "Optical Fiber Cables for Residential and Business Premises," *Journal of Lightwave Technology*, vol. 16, No. 2, pp. 207-213.

Marelli et al., Nov. 11-14, 2007, "Indoor Cables for FTTH Applications, Allowing Quick and Simple Subscriber Connection," 56th

(56) References Cited

OTHER PUBLICATIONS

IWCS Conference: Proceedings of the International Wire & Cable Symposium (IWCS), Inc., pp. 121-127.

Prysmian Cables & Systems, Oct. 5, 2005, "Glossary Excerpt from Prysmian's Wire and Cable Engineering Guide," Revision 3, pp. 1-40, Retrieved from www.prysmian.com.

U.S. Appl. No. 13/790,329, filed Mar. 8, 2013, Bradley J. Blazer, 48 pages.

U.S. Appl. No. 14/099,921, filed Dec. 7, 2013, Mario Sergio Sandate Aguilar, 35 pages.

U.S. Appl. No. 14/192,007, filed Feb. 27, 2014, Warren W. McAlpine, 18 pages.

U.S. Appl. No. 14/231,875, filed Apr. 1, 2014, Michael Emmerich, 38 pages.

U.S. Appl. No. 61/892,534, filed Oct. 18, 2013, Bradley J. Blazer, 42 pages.

U.S. Appl. No. 14/136,311, filed Dec. 20, 2013, Anne G. Bringuier, 22 pages.

U.S. Appl. No. 61/921,769, filed Dec. 30, 2013, Anne G. Bringuier, 30 pages.

U.S. Appl. No. 61/921,777, filed Dec. 30, 2013, Warren W. McAlpine, 56 pages.

U.S. Appl. No. 61/921,755, filed Dec. 30, 2013, David Wesley Chiasson, 42 pages.

U.S. Appl. No. 61/921,763, filed Dec. 30, 2013, William Carl Hurley, 45 pages.

\* cited by examiner

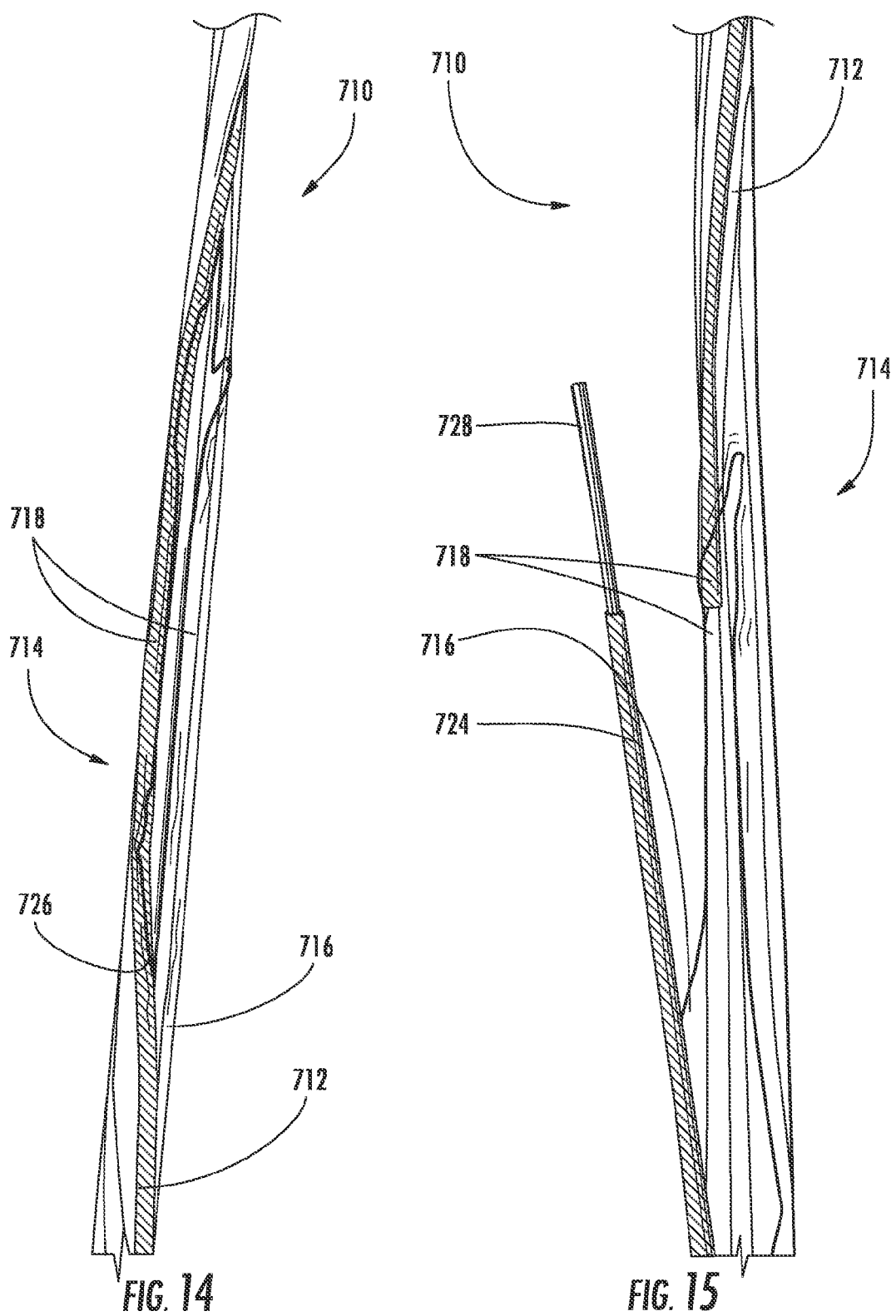

BINDER FILM FOR A FIBER OPTIC CABLE

RELATED APPLICATIONS

This Application is a continuation-in-part of U.S. application Ser. No. 14/091,548 filed Nov. 27, 2013, which is a continuation of International Application No. PCT/US2013/061133 filed Sep. 23, 2013, which is a continuation-in-part of U.S. application Ser. No. 13/790,329 filed Mar. 8, 2013, which claims the benefit of priority of U.S. Application No. 61/705,769 filed on Sep. 26, 2012, the content of each of which is relied upon and incorporated herein by reference in its entirety.

BACKGROUND

Aspects of the present disclosure relate generally to cables, such as fiber optic cables that may support and carry optical fibers as well as other cable components. More specifically, aspects of the present disclosure relate to a binder film for constraining elements of a cable, such as buffer tubes wound around a central strength member in a core of a fiber optic cable.

Loose tube fiber optic cables typically use crisscrossing binder yarns that are counter-helically wrapped about a core of the cable to constrain stranded buffer tubes containing optical fibers, particularly with arrangements of the buffer tubes that include reverse-oscillatory winding patterns of the buffer tubes where the lay direction of the buffer tubes periodically reverses around a (straight) central strength member along the length of the core. The central strength member is typically a rod of a rigid material. Buffer tubes are typically cylindrical tubes (generally 2 to 3 mm in outer diameter) that contain optical fibers. Open space in the interior of a buffer tube may be water-blocked with grease.

Applicants have found that stranded buffer tubes, particularly those stranded in a reverse-oscillating pattern, function as a loaded dual-torsion spring with bias to unwind and correspondingly stretch out along the length of the cable. The binder yarns constrain the buffer tubes in the reversals. However, use of binder yarns may limit the length of cable that can be manufactured without stopping a manufacturing line. For example, due to finite lengths of binder yarns on a bobbin, the manufacturing line may be stopped every 20 kilometers (km) to switch out bobbins. Stopping the manufacturing line and switching out components reduces efficiency. Further, binder yarns may impart distortions or stress concentrations in the stranded buffer tubes, where the binder yarns pass over the respective buffer tubes, potentially resulting in attenuation of optical fibers therein. The level of attenuation is a function of the tension in the binder yarns, which itself may be a function of the number, arrangement, structure, and materials of the buffer tubes, among other variables. Application of binder yarns may accordingly limit the speed of a stranding machine, depending upon allowable binder-yarn tension. A need exists for a binder system that allows for faster manufacturing of cables, reduces potential for attenuation of optical fibers in the cables (such as by avoiding point loading of buffer tubes), and/or allows for long, continuous lengths of such cables to be efficiently manufactured.

To this end, Applicants have experimented with manufacturing stranded cable cores without binder yarns. In one experiment, Applicants attempted to extrude a thin film over a core of stranded buffer tubes with binder yarns removed. The buffer tubes had previously conformed to the stranding pattern about the core and the pattern remained when the binder yarns were removed. However, a "bird cage" (also called "bird nest") or jumble of stranded buffer tubes appeared upon extruding the thin film, which became more and more pronounced until the manufacturing line had to be stopped. Applicants theorize that the buffer tubes migrated axially forcing them outward and away from the central strength member when the binder yarns were removed. The jacket did not cool (and constrict) fast enough, with the stranded buffer tubes held down, to sufficiently couple the stranded buffer tubes to the central strength member of the cable. Instead, the buffer tubes shifted axially due to release of spring forces and pull of the extrusion cone, creating the "bird's cage."

In another experiment, Applicants circumferentially taped only the reversal points of the stranded buffer tubes and to then extruded a jacket over the taped stranded buffer tubes. However, with this experiment a "bird cage" formed, resulting in bulges in the cable just prior to each reversal point of the stranded buffer tubes along the length of the cable. Applicants theorize that the stranded buffer tubes shifted axially between reversals. Release of spring forces in the stranded buffer tubes lifted the buffer tubes away from the central strength member. Axial loading (pulling) on the stranded elements by the extrusion cone then moved the buffer tubes axially, where excess length built up until coupling occurred with the tape. In view of the experimentation, a need exists for a binder system that overcomes some or all of the drawbacks associated with binder yarns, while limiting and/or controlling the impact of unwinding, outward- and axial-migration of the buffer tubes due spring forces in stranded buffer tubes and axial forces from extrusion.

SUMMARY

One embodiment relates to a fiber optic cable, which includes a core and a binder film surrounding the core. The core includes a central strength member and core elements, such as buffer tubes containing optical fibers, where the core elements are stranded around the central strength member in a pattern of stranding including reversals in lay direction of the core elements. The binder film is in radial tension around the core such that the binder film opposes outwardly transverse deflection of the core elements. Further, the binder film loads the core elements normally to the central strength member such that contact between the core elements and central strength member provides coupling therebetween, limiting axial migration of the core elements relative to the central strength member.

Another embodiment relates to a fiber optic cable, which includes a core of the cable having at least one optical fiber, a binder film surrounding the core, and powder particles. The binder film is in tension around the core. The powder particles are water-absorbing powder particles that include a superabsorbent polymer. At least some of the powder particles are attached to the binder film.

Yet another embodiment relates to a method of manufacturing a fiber optic cable, which includes a step of stranding core elements around a central strength member in a pattern of stranding including reversals in lay direction of the core elements. The core elements include a buffer tube surrounding at least one optical fiber, and one or more additional core elements. The one or more additional core elements include at least one of a filler rod and an additional buffer tube. The method includes a step of extruding a binder film to surround the core elements immediately after stranding the core elements, within a distance of at least ten lay lengths of the strand from the closing point where the core elements come together in the pattern of stranding of the core. The method may further include a step of constraining the stranded core elements while the binder film contracts and cools, thereby allowing the binder film to load the stranded core elements against the central strength member to arrest axial migration of the stranded core elements during manufacturing of the cable.

In some embodiments the binder film is twisted around the core and is applied to the core by a rotating extruder. Twisting of the binder film during the extrusion thereof is intended to increase the rate at which the binder film draws down onto the core and/or to increase inward radial tension of the binder film.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which:

FIG. 14 is a digital image of the core of FIG. 12 with a lengthwise cut through the binder film at a mid-span location to provide access to the stranded elements according to an exemplary embodiment.

FIG. 15 is a digital image of the core of FIG. 12 with a stranded element extricated through the cut of FIG. 14 and opened to provide access to optical fibers therein according to an exemplary embodiment.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures and/or described elsewhere in the text.

Figure 1:
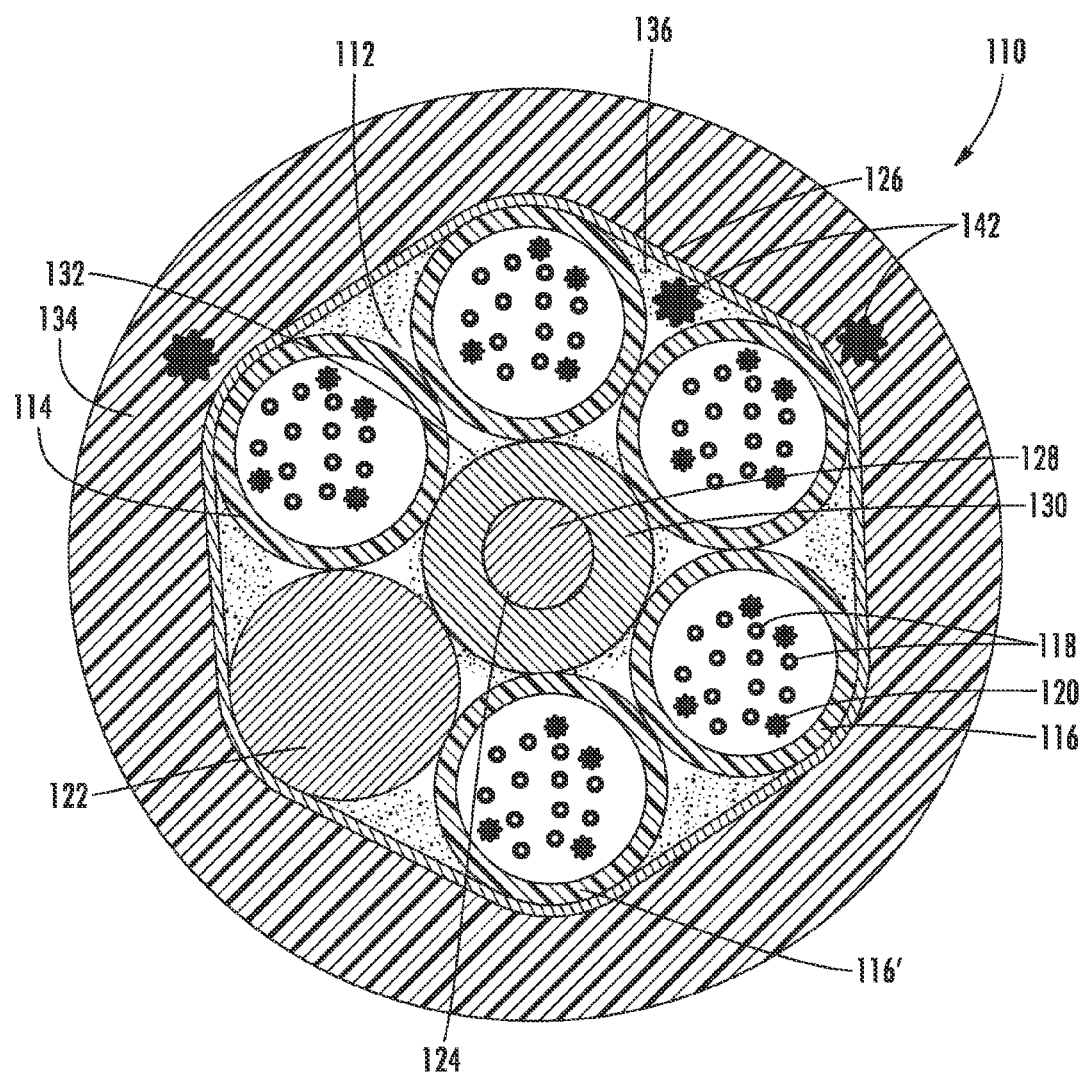
FIG. 1 is a cross-sectional view of a fiber optic cable according to an exemplary embodiment.

Referring to FIG. 1, a cable in the form of a fiber optic cable 110 may be an outside-plant loose tube cable, an indoor cable with fire-resistant/retardant properties, an indoor/outdoor cable, or another type of cable, such as a datacenter interconnect cable with micro-modules or a hybrid fiber optic cable including conductive elements. According to an exemplary embodiment, the cable 110 includes a core 112 (e.g., sub-assembly, micro-module), which may be located in the center of the cable 110 or elsewhere and may be the only core of the cable 110 or one of several cores. According to an exemplary embodiment, the core 112 of the cable 110 includes core elements 114.

In some embodiments, the core elements 114 include a tube 116, such as a buffer tube surrounding at least one optical fiber 118, a tight-buffer surrounding an optical fiber, or other tube. According to an exemplary embodiment, the tube 116 may contain two, four, six, twelve, twenty-four or other numbers of optical fibers 118. In contemplated embodiments, the core elements 114 additionally and/or alternatively include a tube 116 in the form of a dielectric insulator surrounding a conductive wire or wires, such as for a hybrid cable.

In some embodiments, the tube 116 further includes a water-blocking element, such as gel (e.g., grease, petroleum-based gel) or an absorbent polymer (e.g., super-absorbent polymer particles or powder). In some such embodiments, the tube 116 includes yarn 120 carrying (e.g., impregnated with) super-absorbent polymer, such as at least one water-blocking yarn 120, at least two such yarns, or at least four such yarns per tube 116. In other contemplated embodiments, the tube 116 includes super-absorbent polymer without a separate carrier, such as where the super-absorbent polymer is loose or attached to interior walls of the tube. In some such embodiments, particles of super-absorbent polymer are partially embedded in walls of the tube 116 (interior and/or exterior walls of the tube) or bonded thereto with an adhesive. For example, the particles of super-absorbent polymer may be pneumatically sprayed onto the tube 116 walls during extrusion of the tube 116 and embedded in the tube 116 while the tube 116 is tacky, such as from extrusion processes.

According to an exemplary embodiment, the optical fiber 118 of the tube 116 is a glass optical fiber, having a fiber optic core surrounded by a cladding (shown as a circle surrounding a dot in FIG. 1). Some such glass optical fibers may also include one or more polymeric coatings. The optical fiber 118 of the tube 116 is a single mode optical fiber in some embodiments, a multi-mode optical fiber in other embodiments, a multi-core optical fiber in still other embodiments. The optical fiber 118 may be bend resistant (e.g., bend insensitive optical fiber, such as CLEARCURVE™ optical fiber manufactured by Corning Incorporated of Corning, N.Y.). The optical fiber 118 may be color-coated and/or tight-buffered. The optical fiber 118 may be one of several optical fibers aligned and bound together in a fiber ribbon form.

According to an exemplary embodiment, the core 112 of the cable 110 includes a plurality of additional core elements (e.g., elongate elements extending lengthwise through the cable 110), in addition to the tube 116, such as at least three additional core elements, at least five additional core elements. According to an exemplary embodiment, the plurality of additional core elements includes at least one of a filler rod 122 and/or an additional tube 116'. In other contemplated embodiments, the core elements 114 may also or alternatively include straight or stranded conductive wires (e.g., copper or aluminum wires) or other elements. In some embodiments, the core elements are all about the same size and cross-sectional shape (see FIG. 1), such as all being round and having diameters of within 10% of the diameter of the largest of the core elements 114. In other embodiments, core elements 114 may vary in size and/or shape.

Figure 2A:
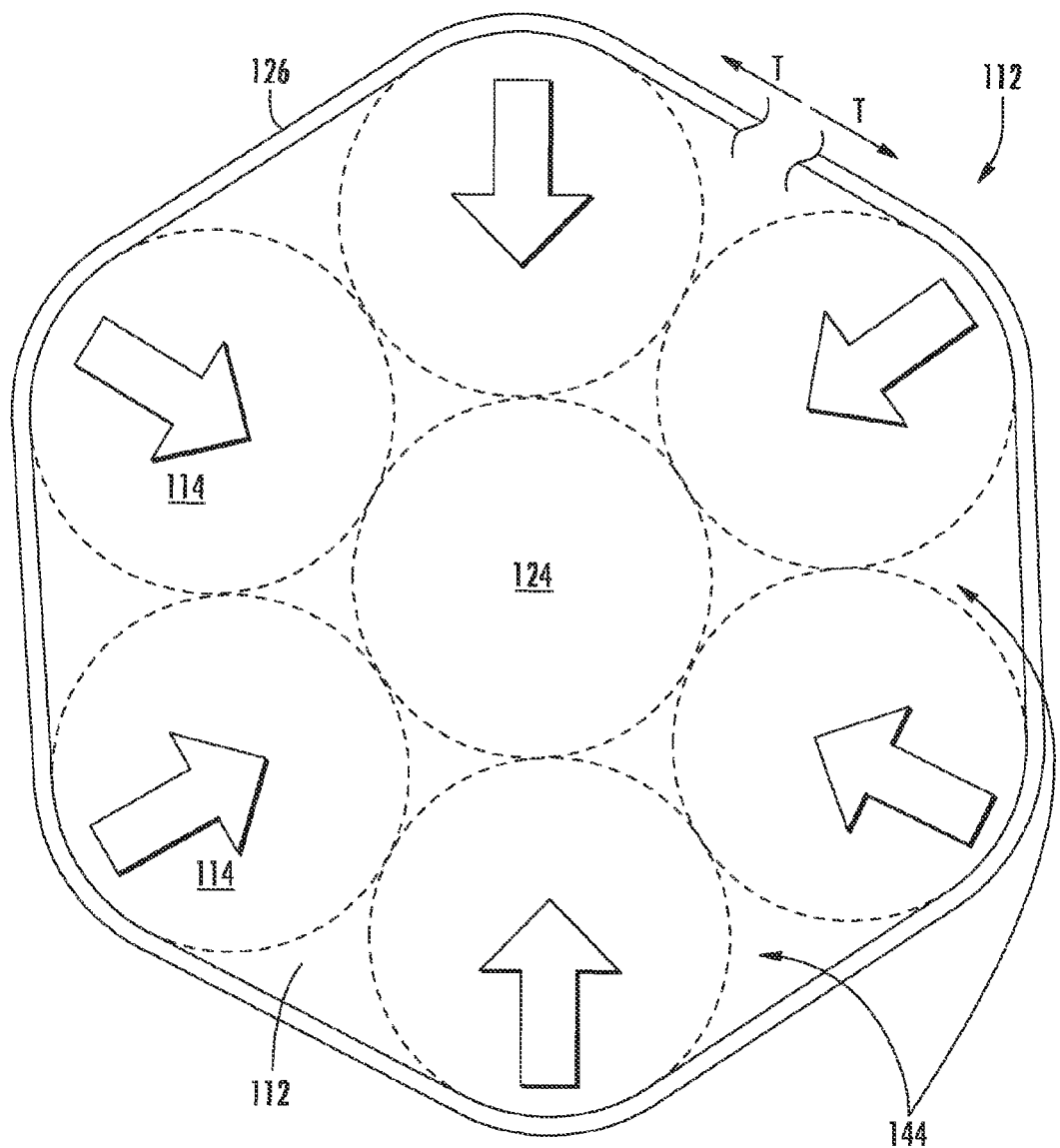
FIGS. 2A and 2B are schematic diagrams of binder films according to exemplary embodiments.
Figure 2B:
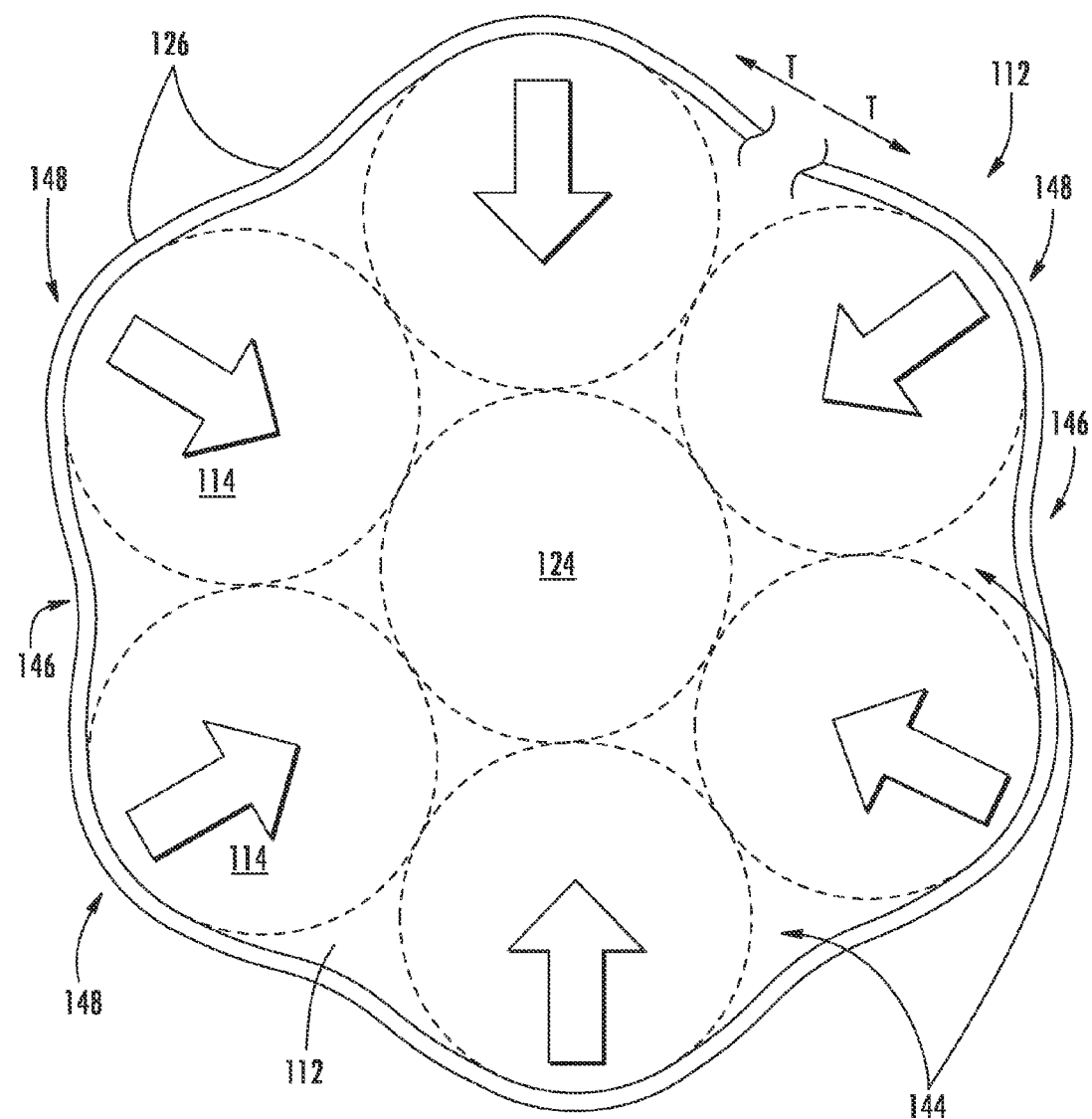

Referring now to FIGS. 1-2, the cable 110 includes a binder film 126 (e.g., membrane) surrounding the core 112, exterior to some or all of the core elements 114. The tube 116 and the plurality of additional core elements 116', 122 are at least partially constrained (i.e., held in place) and directly or indirectly bound to one another by the binder film 126. In some embodiments, the binder film 126 directly contacts the core elements 114. For example, tension T in the binder film 126 (see also FIG. 2A) may hold the core elements 114 against a central strength member 124 and/or one another. The loading of the binder film 126 may further increase interfacial loading (e.g., friction) between the core elements 114 with respect to one another and other components of the cable 110, thereby constraining the core elements 114.

According to an exemplary embodiment, the binder film 126 includes (e.g., is formed from, is formed primarily from, has some amount of) a polymeric material such as polyethylene (e.g., low-density polyethylene, medium density polyethylene, high-density polyethylene), polypropylene, polyurethane, or other polymers. In some embodiments, the binder film 126 includes at least 70% by weight polyethylene, and may further include stabilizers, nucleation initiators, fillers, fire-retardant additives, reinforcement elements (e.g., chopped fiberglass fibers), and/or combinations of some or all such additional components or other components.

According to an exemplary embodiment, the binder film 126 is formed from a material having a Young's modulus of 3 gigapascals (GPa) or less, thereby providing a relatively high elasticity or springiness to the binder film 126 so that the binder film 126 may conform to the shape of the core elements 114 and not overly distort the core elements 114, thereby reducing the likelihood of attenuation of optical fibers 118 corresponding to the core elements 114. In other embodiments, the binder film 126 is formed from a material having a Young's modulus of 5 GPa or less, 2 GPa or less, or a different elasticity, which may not be relatively high.

According to an exemplary embodiment, the binder film 126 is thin, such as 0.5 mm or less in thickness (e.g., about 20 mil or less in thickness, where "mil" is 1/1000th inch). In some such embodiments, the film is 0.2 mm or less (e.g., about 8 mil or less), such as greater than 0.05 mm and/or less than 0.15 mm. In some embodiments, the binder film 126 is in a range of 0.4 to 6 mil in thickness, or another thickness. In contemplated embodiments, the film may be greater than 0.5 mm and/or less than 1.0 mm in thickness. In some cases, for example, the binder film 126 has roughly the thickness of a typical garbage bag. The thickness of the binder film 126 may be less than a tenth the maximum cross-sectional dimension of the cable, such as less than a twentieth, less than a fiftieth, less than a hundredth, while in other embodiments the binder film 126 may be otherwise sized relative to the cable cross-section. In some embodiments, when comparing average cross-sectional thicknesses, the jacket 134 is thicker than the binder film 126, such as at least twice as thick as the binder film 126, at least ten times as thick as the binder film 126, at least twenty times as thick as the binder film 126. In other contemplated embodiments, the jacket 134 may be thinner than the binder film 126, such as with a 0.4 mm nylon skin-layer jacket extruded over a 0.5 mm binder film.

The thickness of the binder film 126 may not be uniform around the bound stranded elements 114. Applicants have found some migration of the material of the binder film 126 during manufacturing. For example, the belts 322 (e.g., treads, tracks) of the caterpuller 320 shown in FIGS. 4-6 impart compressive forces on the binder film 126 that may somewhat flatten the binder film 126 on opposing sides thereof, as the binder film 126 solidifies and contracts to hold the stranded elements 114 to the central strength member 124. As such, the "thickness" of the binder film 126, as used herein, is an average thickness around the cross-sectional periphery. For example, the somewhat flattened portions of the binder film 126 caused by the caterpuller 320 may be at least 20% thinner than the adjoining portions of the binder film 126 and/or the average thickness of the binder film 126.

Figure 4:
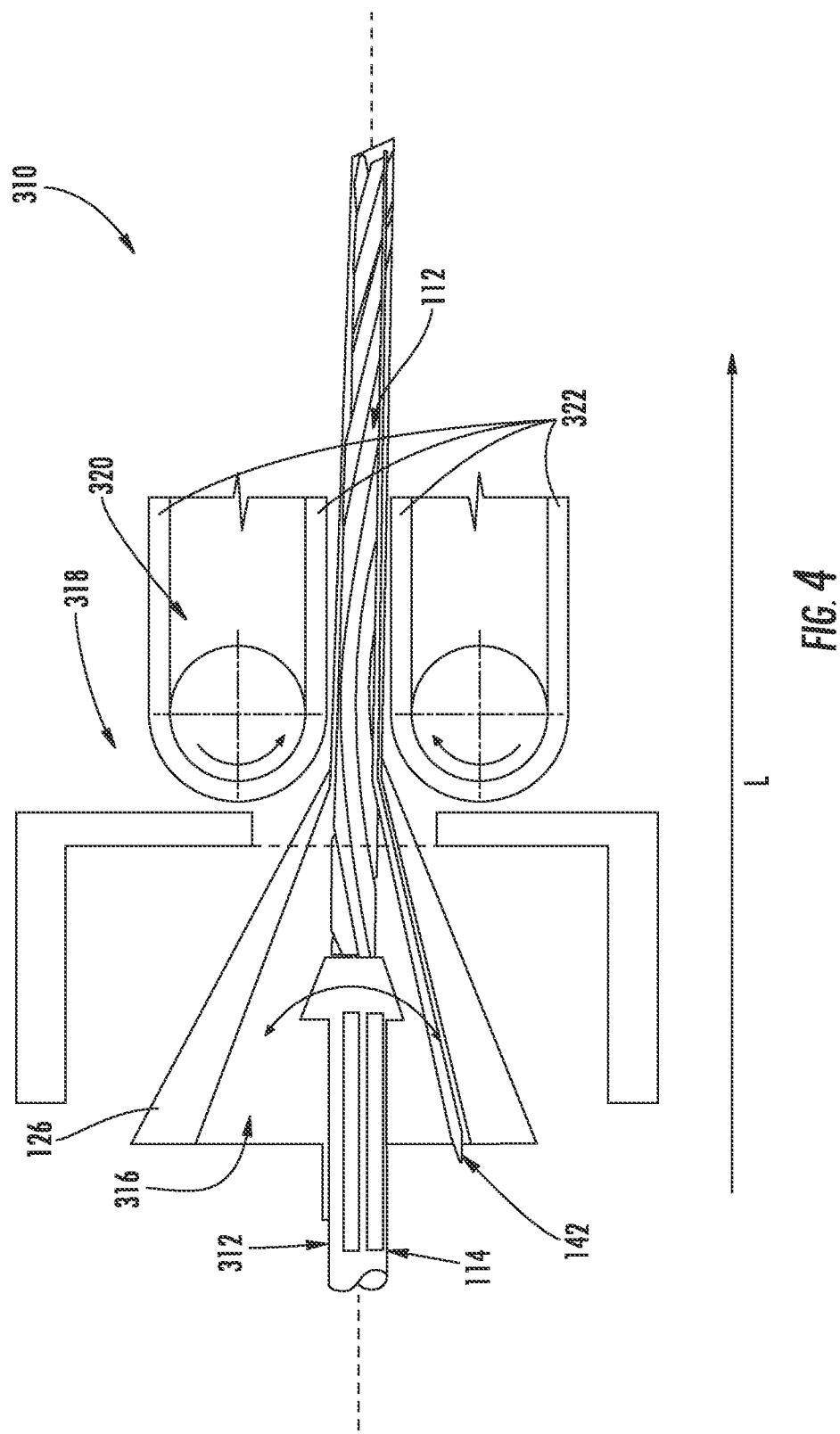
FIGS. 4-6 are schematic diagrams of cables being manufactured according to various exemplary embodiments.
Figure 5:
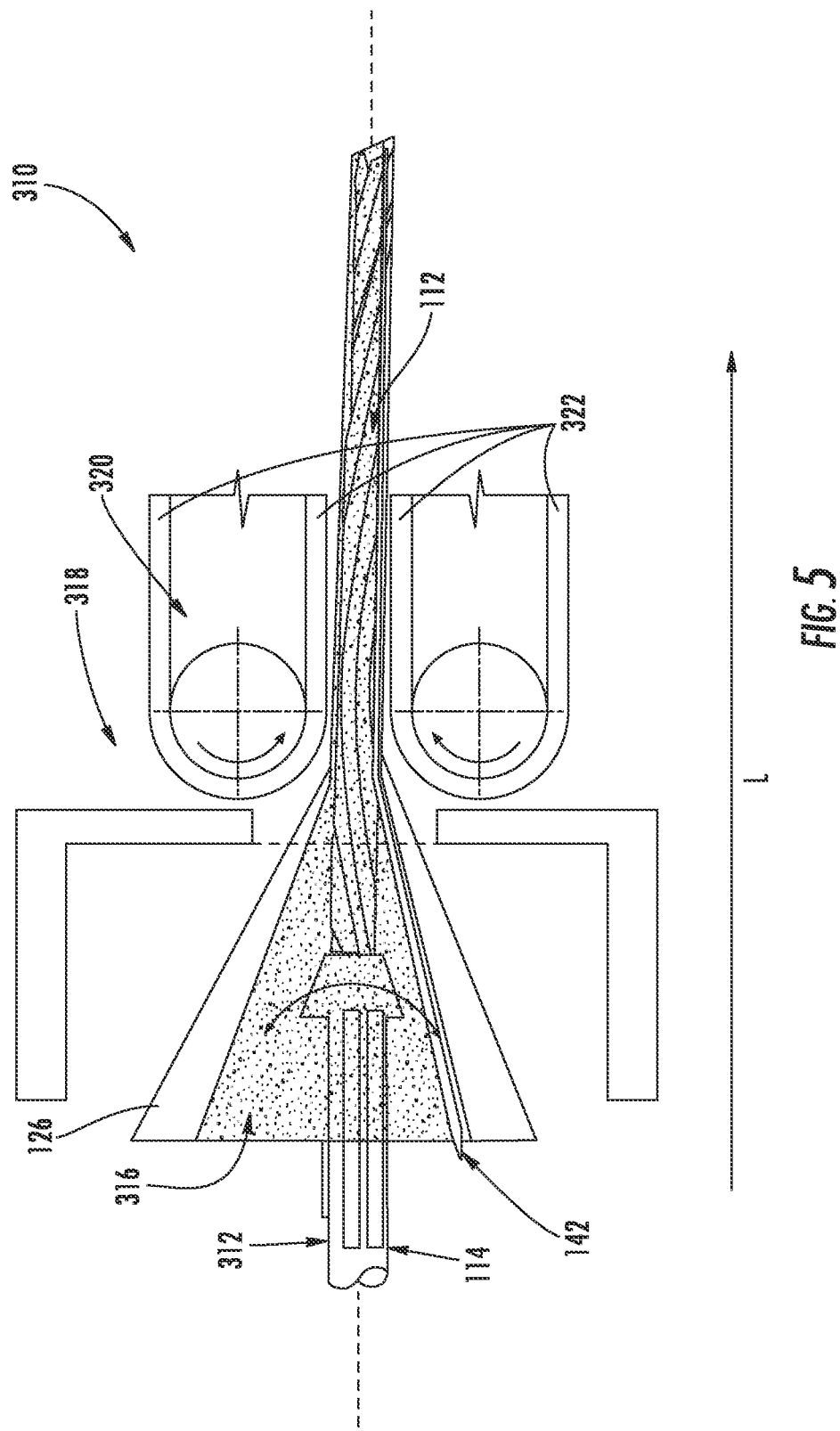
Figure 6:
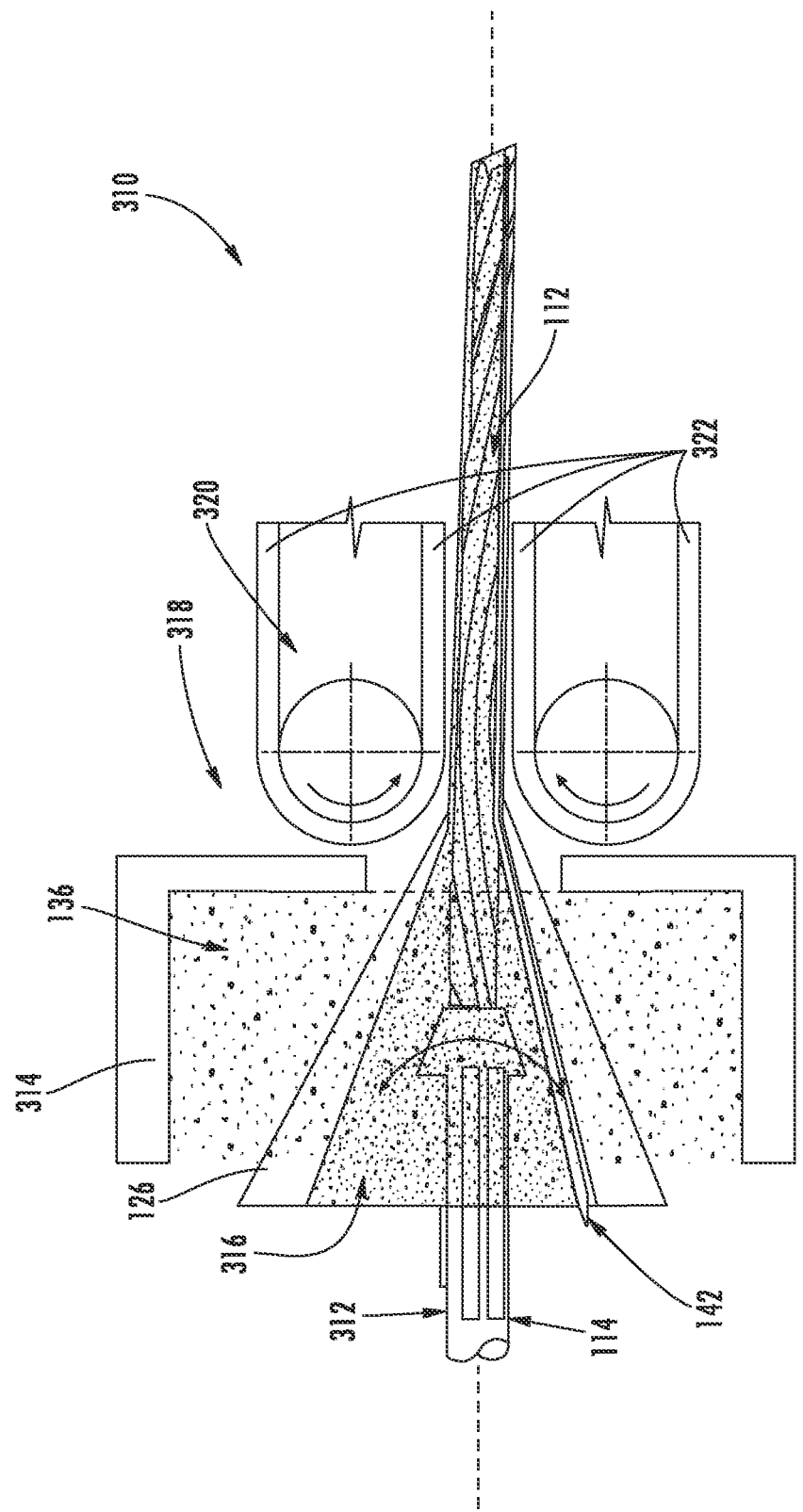

Use of a relatively thin binder film 126 allows for rapid cooling (e.g., on the order of milliseconds, as further discussed with regard to the process 310 shown in FIGS. 4-6) of the binder film 126 during manufacturing and thereby allowing the binder film 126 to quickly hold the core elements 114 in place, such as in a particular stranding configuration, facilitating manufacturing. By contrast, cooling may be too slow to prevent movement of the stranded core elements when extruding a full or traditional jacket over the core, without binder yarns (or the binder film); or when even extruding a relatively thin film without use of a caterpuller (e.g., caterpuller 320 as shown in FIG. 4; sometimes called a "caterpillar") or other assisting device. However such cables are contemplated to include technology disclosed herein (e.g., coextruded access features, embedded water-swellable powder, etc.) in some embodiments. Subsequent to the application of the binder film 126, the manufacturing process may further include applying a thicker jacket 134 to the exterior of the binder film 126, thereby improving robustness and/or weather-ability of the cable 110. In other contemplated embodiments, the core 112, surrounded by the binder film 114, may be used and/or sold as a finished product (see generally FIGS. 2A and 2B).

Still referring to FIG. 1, the cable 110 further includes the central strength member 124, which may be a dielectric strength member, such as an up-jacketed glass-reinforced composite rod. In other embodiments, the central strength member 124 may be or include a steel rod, stranded steel, tensile yarn or fibers (e.g., bundled aramid), or other strengthening materials. As shown in FIG. 1, the central strength member 124 includes a center rod 128 and is up jacketed with a polymeric material 130 (e.g., polyethylene, low-smoke zero-halogen polymer).

According to an exemplary embodiment, powder particles 132, such as super-absorbent polymer and/or another powder (e.g., talc), or another water-absorbing component (e.g., water-blocking tape, water-blocking yarns) are attached to the outer surface of the central strength member 124. At least some of the powder particles 132 may be partially embedded in the up-jacket 130, and attached thereto by pneumatically spraying the particles 132 against the up-jacket 130 while the up-jacket 130 is in a tacky and/or softened state. The powder particles 132 may increase or otherwise affect coupling between the central strength member 124 and the core elements 114 around the central strength member 124.

Alternatively or in addition thereto, the particles 132 may be attached to the up-jacket 130 with an adhesive. In some embodiments, the central strength member 124 includes the rod 128 without an up-jacket, and the particles 132 may be attached to the rod 128. In contemplated embodiments, a strength member, such as a glass-reinforced rod or up-jacketed steel rod, includes super-absorbent polymer or other particles 132 attached to the outer surface thereof, as disclosed above, without the strength member being a central strength member.

In some embodiments, the core elements 114 are stranded (i.e., wound) about the central strength member 124. The core elements 114 may be stranded in a repeating reverse-oscillatory pattern, such as so-called S-Z stranding (see generally FIGS. 4-6), or other stranding patterns (e.g., helical). The binder film 126 may constrain the core elements 114 in the stranded configuration, facilitating mid-span (see FIGS. 14-15) or cable-end (see FIG. 13) access of the optical fibers 118 and cable bending, without the core elements 114 releasing tension by expanding outward from the access location or a bend in the core 112 of the cable 110.

In other contemplated embodiments, the core elements 114 are non-stranded. In some such embodiments, the core elements 114 include micro-modules or tight-buffered optical fibers that are oriented generally in parallel with one another inside the binder film 126. For example, harness cables and/or interconnect cables may include a plurality of micro-modules, each including optical fibers and tensile yarn (e.g., aramid), where the micro-modules are bound together by the binder film 126 (see generally FIGS. 2A and 2B). Some such cables may not include a central strength member. Some embodiments include multiple cores or sub-assemblies, each bound by a binder film 126, and jacketed together in the same carrier/distribution cable, possibly bound together with another binder film. For some such embodiments, techniques disclosed herein for rapid cooling/solidification during extrusion and inducing radial tension in the binder film 126 for coupling to a central strength member 124 may be unnecessary for manufacturing.

Figure 3:
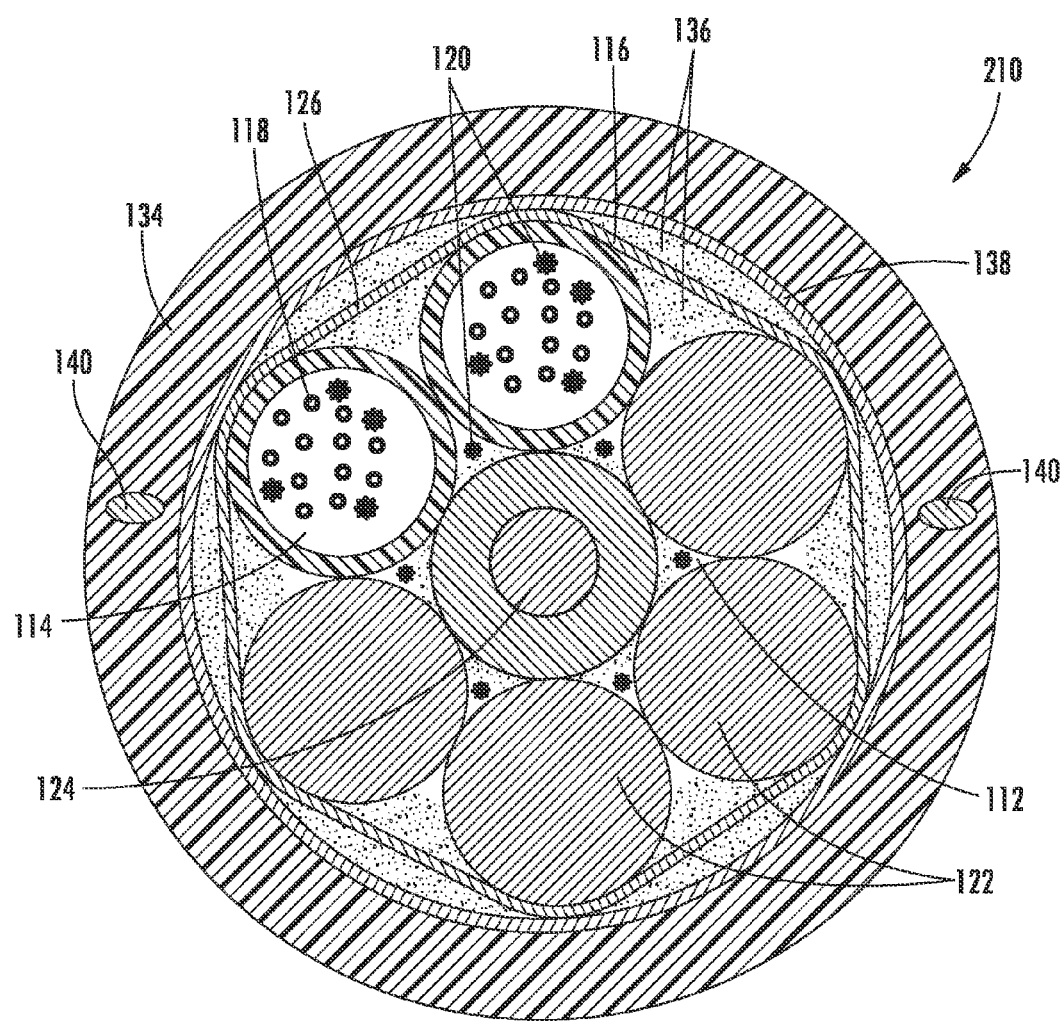
FIG. 3 is a cross-sectional view of a fiber optic cable according to another exemplary embodiment.

FIG. 3 includes a cable 210 having some components similar to the cable 110, such as the binder film 126. Features of the cable 110 and the cable 210 can be mixed and matched in different combinations to form other cables according to the disclosure herein.

Referring now to FIGS. 1 and 3, in some embodiments the binder film 126 of the cable 110, 210 includes powder particles 136, which may be used for providing water blocking and/or for controlling coupling (e.g., decoupling) of adjoining surfaces in the cable 110. In some embodiments, the powder particles 132, 136 have an average maximum cross-sectional dimension of 500 micrometers ($\mu$m) or less, such as 250 $\mu$m or less, 100 $\mu$m or less. Accordingly, the particles 132, 136 may be larger than water-blocking particles that may be used inside the tubes 116, impregnated in yarns or embedded in interior walls of the tubes 116 as disclosed above, which may have an average maximum cross-sectional dimension less than 75 $\mu$m, to mitigate optical fiber micro-bend attenuation.

In some embodiments, at least some of the powder particles 136 are coupled directly or indirectly to the binder film 126 (e.g., attached bound directly thereto, adhered thereto, in contact therewith), such as coupled to a surface of the binder film 126, coupled to an exterior surface of the binder film 126, coupled to an outside surface of the binder film 126 and/or an inside surface of the binder film 126. According to an exemplary embodiment, at least some of the powder particles 136 are partially embedded in the binder film 126, such as passing partly through a surrounding surface plane of the binder film 126 while partially projecting away from the surface of the binder film 126; or, put another way, having a portion thereof submerged in the binder film 126 and another portion thereof exposed. In some embodiments, a rotating die may be used to increase normal force on the tubes.

The powder particles 136 may be attached to the binder film 126 by pneumatically spraying the powder particles onto the binder film 126, into and outside of the associated extrusion cone (see also FIG. 7), as further discussed below with regard to FIGS. 4-6. The pneumatic spraying may also facilitate rapid cooling of the binder film 126. In other embodiment, static electricity or other means may be used to motivate the powder particles 136 to embed in the binder film 126 or otherwise couple thereto. In other embodiments, glues or other attachment means are used to attach the powder particles 136 to the binder film 126. Use of the binder film 126 as a carrier for super-absorbent polymer particles may remove need for water-blocking tape between the core and cable components outside the core, as well as remove need for binder yarn to hold the water-blocking tape in place. In still other embodiments, powder particles may be present but loose and/or not attached to the binder film 126. In contemplated embodiments, the binder film 126 may be coated with a continuous water-blocking material/layer, or may include other types of water-blocking elements or no water-blocking elements.

According to an exemplary embodiment, the powder particles 132, 136 include super-absorbent polymer particles, and the amount of super-absorbent polymer particles is less than 100 grams per square meter of surface area (g/m$^2$) of the respective component to which the powder particles are coupled (central strength member 124 or binder film 126). In some such embodiments, the amount of super-absorbent polymer particles is between 20 and 60 g/m$^2$, such as between 25 and 40 g/m$^2$. According to an exemplary embodiment, the amount of super-absorbent polymer or other water-blocking elements used in the cable is at least sufficient to block a one-meter pressure head of tap water in a one-meter length of the cable 110, 210, according to industry standard water penetration tests, which may correspond to the above quantities, depending upon other characteristics of the respective cable 110, 210, such as interstitial spacing between core elements 114.

According to an exemplary embodiment, at least some of the powder particles 136 are positioned on an inside surface of the binder film 126 (see FIG. 1) between the binder film 126 and the core elements 114. In addition to blocking water, such placement may mitigate adhesion between the binder film 126 and the core elements 114 during manufacturing of the cable 110, 210, such as if the binder film 126 is tacky from extrusion or other manufacturing approaches, such as laser welding or heat softening. Alternatively or in combination therewith, in some embodiments, at least some of the powder particles 136 are positioned on an outside surface of the binder film 126 (see FIG. 3).

Powder particles 136 positioned on the outside surface of the binder film 126 may provide water blocking between the binder film 126 and components of the cable 210 exterior thereto, such as metal or dielectric armor 138 (FIG. 3) or micro-modules outside the core 112. The armor 138, as shown in FIG. 3, may be corrugated steel or another metal and may also serve as a ground conductor, such as for hybrid fiber optic cables having features disclosed herein. Use of a film binder, instead of a thicker layer, allows a narrower "light armor" design, where there is no jacket between the armor 138 and the core 112. Alternatively, the armor 138 may be dielectric, such as formed from a tough polymer (e.g., some forms of polyvinyl chloride).

According to an exemplary embodiment, embedded material discontinuities 140 (FIG. 3) in the jacket 134, such as narrow strips of co-extruded polypropylene embedded in a polyethylene jacket 134, may provide tear paths to facilitate opening the jacket 134. Alternatively, ripcords 142 (FIG. 1) in or adjoining the jacket 134 may facilitate opening the jacket 134. The powder particles 136 may further facilitate stripping the jacket 134 from the core 112 by decoupling surfaces adjacent to the powder particles 136. As such, depending upon placement of the powder particles 136, the particles 136 may facilitate decoupling of the jacket 134 from the binder film 126, such as for the cable 110 shown in FIG. 1 where the jacket 134 and binder film 126 are adjoining (i.e., particles 136 placed between the jacket 134 and binder film 126), and/or may facilitate decoupling of the binder film 126 from the core elements 114 (i.e., particles 136 placed between the binder film 126 and core elements 114).

In some embodiments, the jacket 134 and binder film 126 may blend together during extrusion of the jacket 134 over the binder film 126, particularly if the jacket 134 and the binder film 126 are formed from the same material without powder particles 136 therebetween. In other embodiments, the jacket 134 and the binder film 126 may remain separated or at least partially separated from one another such that each is visually distinguishable when the cable 110, 210 is viewed in cross-section. In some embodiments, the binder film 126 and the jacket 134 are not colored the same as one another. For example, they may be colored with visually distinguishable colors, having a difference in "value" in the Munsell scale of at least 3. For example, the jacket 134 may be black while binder film 126 may be white or yellow, but both including (e.g., primarily consisting of, consisting of at least 70% by weight) polyethylene.

In some contemplated embodiments, the jacket 134 is opaque, such as colored black and/or including ultra-violet light blocking additives, such as carbon-black; but the binder film 126 is translucent and/or a "natural"-colored polymer, without added color, such that less than 95% of visible light is reflected or absorbed by the binder film 126. Accordingly, in at least some such embodiments, upon opening or peeling back the jacket 134 away from the binder film 126 and core 112, the tube 116 and at least some of the plurality of additional core elements 114 are at least partially visible through the binder film 126 while being constrained thereby with the binder film 126 unopened and intact, such as visible upon directing light from a 25 watt white light-bulb with a 20-degree beam directly on the binder film 126 from a distance of one meter or less in an otherwise unlit room. In contemplated embodiments, the core includes a tape or string (e.g., polymeric ripcord), beneath the binder film 126 and visible through the binder film 126, which may include indicia as to contents of the core 112 or a particular location along the length of the cable 110.

According to an exemplary embodiment, the binder film 126 is continuous peripherally around the core, forming a continuous closed loop (e.g., closed tube) when viewed from the cross-section, as shown in FIGS. 1-3, and is also continuous lengthwise along a length of the cable 110, 210, where the length of the cable 110, 210 is at least 10 meters (m), such as at least 100 m, at least 1000 m, and may be stored on a large spool. In other contemplated embodiments, the cable 110, 210 is less than 10 m long.

In some embodiments, around the cross-sectional periphery of the binder film 126, the binder film 126 takes the shape of adjoining core elements 114 and extends in generally straight paths over interstices 144 (FIG. 2A) between the core elements 114, which may, in some embodiments, result in a generally polygonal shape of the binder film 126 with rounded vertices, where the number of sides of the polygon corresponds to the number of adjoining core elements 114.

In some embodiments, the binder film 126 arcs into the interstices 144 (FIG. 2B) so that the binder film 126 does not extend tangentially between adjoining core elements 114, but instead undulates between concave arcs 146 and convex arcs 148 around the periphery of the stranded elements 114 and intermediate interstices 144. The concave arcs 148 may not be perfect circular arcs, but instead may have an average radius of curvature that is greater than the radius of one or all of the stranded elements 114 and/or the central strength member 124. Put another way, the degree of concavity of the concave arcs 146 is less than the degree of convexity of the convex arcs 148. Applicants theorize that the undulation between concave arcs 146 and convex arcs 148 constrains the stranded elements 114, opposing unwinding of the stranded elements 114 about the central strength member 124. Applying a vacuum to the interior of the extrusion cone (see space 316 in FIGS. 4-6; see also FIG. 7) may increase the draw-down rate of the extrudate, and may facilitate formation of the concave arcs 146. Applicants further believe that the undulation and concave arcs 146 increase the torsional stiffness of the binder film 126.

Use of a continuous binder film 126 may block water from being able to reach the core 112. In other embodiments, the binder film 126 includes pinholes or other openings. In some contemplated embodiments, binder films may be extruded in a criss-crossing net mesh pattern of film strips, or as a helical or counter-helical binder film strip(s), such as via rotating cross-heads or spinnerets. Either the core or the cross-head may be rotated, and the core may be rotated at a different rate than the cross-head, or vice versa. In other contemplated embodiments, a pre-formed curled or C-shaped tube may be used as the binder 126, where the core 112 is bound thereby.

Referring once more to FIGS. 2A-2B, in some embodiments the binder film 126 is in tension T around the core 112, where hoop stress is spread relatively evenly around the transverse (i.e., cross-sectional) periphery of the binder film 126 where the binder film 126 overlays (e.g., contacts directly or indirectly) elements of the core 112. As such, the binder film 126 opposes outwardly transverse deflection of the core elements 114 relative to the rest of the cable 110, 210, such as outward torsional spring force of S-Z stranded core elements 114, buckling deflection of un-stranded core elements 114, such as flat fiberglass yarns, or other loading. As such, the tension T in the binder film 126 may improve cable stability and integrity, such as in compression of the cable 110, 210.

In some embodiments, the tension T of the binder film 126 has a distributed loading of at least 5 newtons (N) per meter (m) length of the cable 110, 210, which may be measured by measuring the average diameter of an intact binder film 126 surrounding the core elements 114, then opening the binder film 126, removing the core elements 114, allowing time for the binder film 126 to contract to an unstressed state (e.g., at least a day, depending upon material) at constant temperature, then measuring the decrease in binder film 126 widthwise dimension (i.e., compared to the average periphery). The tension T is the loading required to stretch the binder film 126 to the original width.

Figure 7:
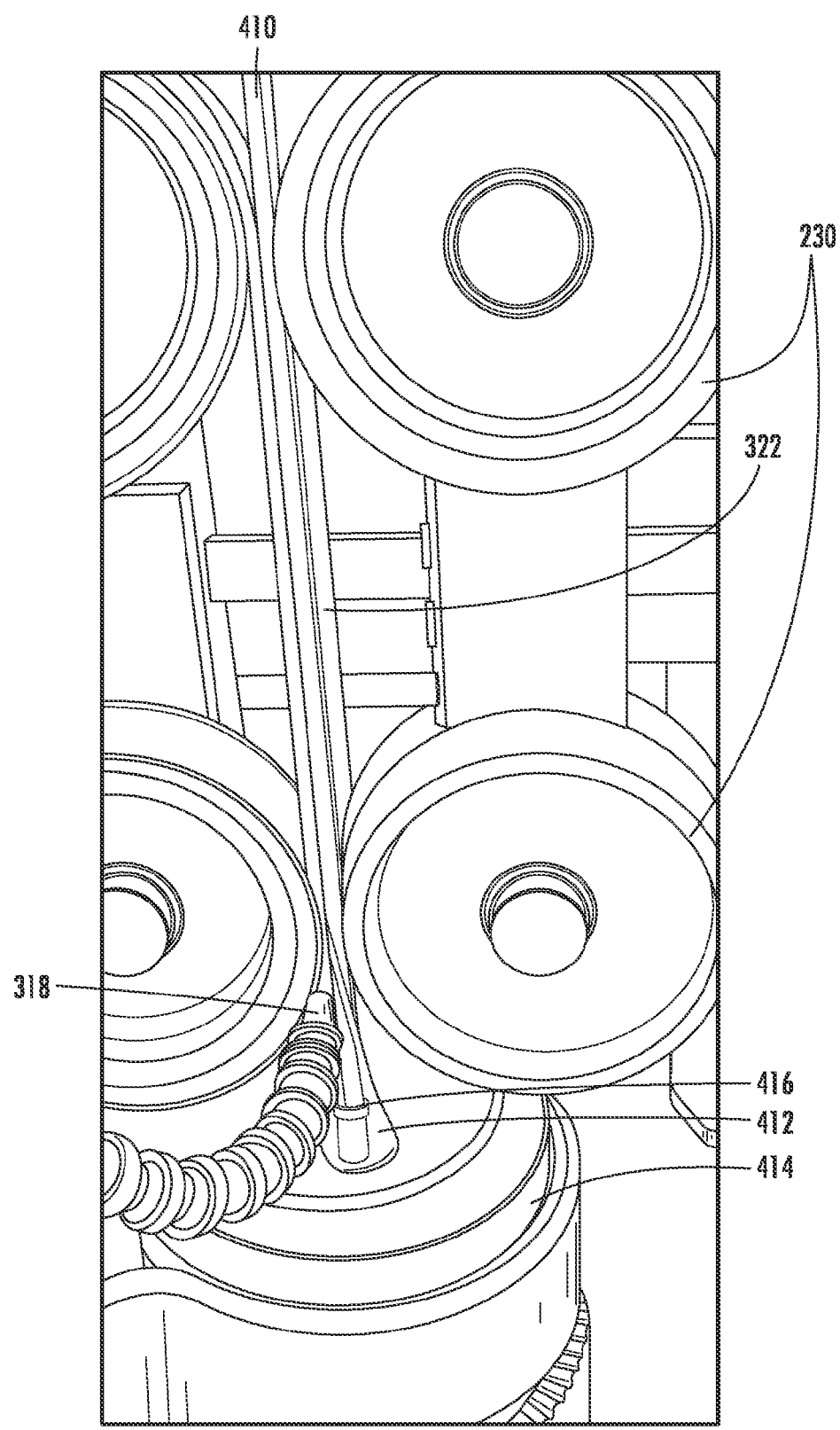
FIG. 7 is a perspective view of a binder film being extruded around a core of stranded elements according to an exemplary embodiment.

Referring now to FIGS. 4-6, the binder film 126 (shown as an extrusion cone contracting about the core 112 along the manufacturing line direction L) may be applied in conjunction with the manufacturing process or method 310, which may include stranding (see also FIG. 7). In some such embodiments, the core elements 114 (see also FIGS. 1-3) (e.g., buffer tubes) are stranded by extending an oscillating nose piece 312 through a crosshead and into a space 316 surrounded by the extrudate cone of the binder film 126, as shown in FIGS. 4-6. In some embodiments, the binder film 126 is extruded around the core elements 114 immediately after the core elements 114 are stranded around the central strength member 124, such as within a distance of at least ten lay lengths (e.g., within six lay lengths) of the strand from the closing point of the core elements 114, where the core elements 114 come together at the trailing end of the stranding machine in the pattern of stranding of the core 112. Close proximity of the stranding machine and the extruder essentially allows the stranding machine to compensate for slipping between the stranded elements 114 and the central strength member 124, such as due to the pull of the extrusion cone (prior to coupling between the stranded elements 114 and the central strength member 124 by the binder film 126 and/or caterpuller 320).

An industry-standard definition for the lay length of helically stranded elements (e.g., helical lay length) is the lengthwise distance along the cable (and along a central strength member, if present) for a full turn of the stranded elements about the lengthwise axis of the cable (e.g., the length through the center of a single helical spiral). An industry-standard definition for the lay length of reverse-oscillatory stranded elements, such as SZ stranded elements, is the lengthwise distance between reversal points of the strand divided by the sum of turns of the stranded elements (such as turns about a central strength member) between the reversal points, which may include a fraction of a turn; akin to the "average" helical lay length.

In the space 316 and outside the extrudate cone of the binder film 126, powder particles 136 (see FIG. 6), such as super-absorbent polymer particles (e.g., Cabloc® GR-111), may be embedded in the binder film 126 by pneumatic conveyance, such as by being carried and deposited via a spinning vortex of turbulent air flow in a chamber 314 (FIG. 6) outside the extrudate cone of the binder film 126 and/or by being drawn into a high-pressure air flow by a venturi nozzle and carried thereby until accelerated and then released from the air flow via a conventional nozzle in or directed to the interior of the extrudate cone of the binder film 126. According to such an embodiment, momentum of the powder particles 136 causes them to impact walls of the molten extrudate cone of the binder film 126. The force of impact and the state of the extrudate (e.g., polyethylene) causes the particles to mechanically adhere to the binder film 126, but may not arrest elongation of the extrudate, permitting the extrudate to continue to draw/shrink to a relatively thin film that may form tightly around the core elements 114.

Air flows carrying the powder particles 136 may synergistically be used to hasten cooling of the binder film 126, and may still further be used to shape or thin-out the binder film 126. Additional flows of cooling fluid 318 (e.g., dry air if associated binder film 126 surface(s) are with super-absorbent polymer particles; fine water mist or water bath, if surfaces are without super-absorbent polymer particles) may be used to further hasten cooling of the binder film 126 so that the binder film 126 will be sufficiently cooled and solidified in order to constrain the core elements 114 within fractions of a second after stranding of the core elements 114. Furthermore, air flows carrying the powder particles 136 may be coordinated on opposite sides of the binder film to control shaping of the binder film 126 and/or prevent distortion of the binder film 126. Adherence of the particles 136 to the binder film 126 may assist containing the particles 136 during cable end- and mid-span access.

In some embodiments, the binder film 126 is continuous and watertight, which may prevent the powder particles 136 (e.g., super-absorbent polymer particles) in the interior of the binder film 126 from absorbing moisture or water on the exterior of the binder film 126. To prevent axial migration of water along the exterior of the binder film 126, between the binder film 126 and additional cabling layers—such as metallic armor, nonmetallic armor, additional strength elements, and/or an additional exterior jacket over the cable core; the powder particles 136 may be applied to the exterior of the binder film 126 while the binder film 126 is still molten and immediately prior to receipt of the cable 110, 210 by an anti-torsion caterpuller 320. The caterpuller 320 may be particularly useful for reverse-oscillatory stranding patterns, such as so-called "SZ" strands, because the caterpuller 320 holds down and constrains the reversal. As such, the caterpuller is preferably positioned within a distance of at least one lay length of the strand from the closing point of the core elements 114, where the core elements 114 come together at the trailing end of the stranding machine in the pattern of stranding of the core 112. The extrusion head 414 and extrudate cone (see FIG. 7) is located between the stranding machine and the caterpuller 320.

Particularly in stranding arrangements of core elements 114 that include reverse-oscillatory winding patterns (e.g., S-Z stranding), the anti-torsion caterpuller 320 may serve to apply an opposing torque to torque induced by tension and rotation of the core elements 114. Belts 322 of the anti-torsion caterpuller 320 may be coupled together so that the belts 322 register on the centerline of the cable 110, 210, which permits automatic adjustment of the spacing of the belts for different cable diameters. According to an exemplary embodiment, the caterpuller 320 is located within 100 mm of the release point of the oscillating nose piece 312 or the closing point of the core elements 114, where the core elements 114 come together, such as to contact one another and/or a central strength member (see, e.g., central strength member 124 as shown in FIG. 1). Close proximity of the caterpuller 320 and closing point of the core elements 114 prevents the core elements 114 from unwinding when the strand direction is reversed. The caterpuller 320 also isolates tension of individual core elements 114 on the in-coming side thereof, reducing the likelihood of distorting desired shapes of the binder film as the core 112 (see also FIGS. 1-3) is formed. Further, the caterpuller 320 allows the binder film 126 to cool quickly while not under load from released spring forces of the stranded elements 114 (which are constrained instead by the belts of the caterpuller 320). As such, the binder film 126 is able to cool and constrict to a degree that applies a load to the stranded elements 114 that compresses the elements 114 against the central strength member 124, providing coupling therebetween. Without the caterpuller 320 and/or cooling pneumatic air flow 318, the binder film 126 may be outwardly loaded by release of spring forces in the stranded elements 114 while cooling (i.e., binder film solidifies while outwardly stretched) such that the resulting cooled binder film 126 may not provide sufficient coupling force between the stranded elements 114 and central strength member 124 to prevent formation of a "bird cage," resulting in bulges in the finished cable at the reversal points of the stranded elements 114. When the core exits the caterpuller 320, the core elements 114 are constrained from unwinding by the solidified binder film 126. In contemplated embodiments, the caterpuller 320 may further be used for cooling (e.g., includes cooled belts) and/or may include a series of shaped rollers, such as having a groove along which the core 112 is constrained.

According to an exemplary embodiment, the binder film 126 maintains the integrity of the core 112 during subsequent processing steps, which may include tight bends of the cable 110, 210 and/or applications of additional cable components. In some embodiments, the binder film 126 has the additional advantageous feature of removal by initiating a tear (see FIG. 12), such as with ripcords 142 positioned beneath the binder film 126 (see ripcords 142 above and below the binder film 126 as shown in FIG. 1). The binder film 126 distributes the load from such ripcords 142 over a larger area of core elements 114 (when compared to ripcords beneath binder yarns), which reduces pressure on the core elements 114 during the tear.

Still referring to FIGS. 4-6, a method 310 of manufacturing a fiber optic cable 110, 210 includes steps of stranding core elements 114 about a central strength member 124, forming a binder film 126 to surround the core elements 114 and to at least partially constrain the core elements 114, constraining the core 112 while the binder film 126 solidifies and contracts, and/or extruding a jacket 134 of the cable 110, 210 to surround the binder film 126. The jacket 134 may be thicker than the binder film 126. The core elements 114 include a tube 116 surrounding at least one optical fiber 118, and a plurality of additional core elements 114, such as at least one of a filler rod 112 and an additional tube 116'. In some such embodiments, the binder film 126 includes (e.g., comprises, consists essentially of, consists of) a layer of material having a Young's modulus of 3 gigapascals (GPa) or less. In some such embodiments, the method 310 further includes steps of forming the binder film 126 so that the binder film 126 is 0.5 mm or less in thickness, and actively cooling the binder film 126. As the binder film 126 cools, such as by a cooling flow of air, and the core 112 is supported by a caterpuller 320, the binder film 126 shrinks around the core elements 114 to constrain the core elements 114 such that the core elements 114 are bound to the central strength member 124 under tension T of the binder film 126 and such that a coupling force (e.g., static frictional force) between the core elements 114 and the central strength member 124 limits axial and/or outward migration of the core elements 114 from the central strength member 124. In some such embodiments, the method 310 further includes moving powder particles 132, 136 and directing the powder particles 132, 136 toward the binder film 126 and/or central strength member 124, while the binder film 126 and/or up-jacket 130 is at least partially fluid (e.g., tacky). At least some of the powder particles 132, 136 are partially embedded in the binder film 126 and/or up-jacket 130 upon cooling.

Such a manufacturing process 310 may remove a need for some or all binder yarns and water-blocking tape, described in the Background, and replace such components with a continuously-extruded binder film 126 that may have super-absorbent polymer particles 136 embedded in the interior surface of the binder film 126 and/or on the exterior surface of the binder film 126. In addition, the binder film 126 may constrain the reversal of stranded core elements 114 in the radial direction. Rip cords 142, material discontinuities 140, or other access features may be integrated with the cable 110, 210, such as being located outside of, in, or underneath the binder film 126 for either armored-type cable (see generally FIG. 3) or duct-type cable (see generally FIG. 1).

Referring again to FIG. 4, core elements 114, in the form of the tubes 116 containing optical fibers 118, are guided through an extrusion crosshead and tip by a stranding (oscillating) nose piece 312. An extruded binder film 126 is applied to the core 112 immediately after the core 112 is formed by the oscillation of the nose piece 312. Rotation of the stranded core 112 and central strength member 124 is limited by the anti-torsion caterpuller 320. Further, the anti-torsion caterpuller 320 may serve to prevent unwinding during the reversal of the oscillation direction, allowing the binder film 126 to quickly cool and constrict to load the stranded elements 114 against the central strength member 124 such that there is sticking contact therebetween (e.g., static friction) that limits axial migration of the stranded elements 114.

As shown in FIG. 4, the binder film 126 may be applied with no water-absorbent powder particles. In FIG. 5, the cable 110, 210 may be produced with an interior application but without an exterior application of water-absorbent powder particles 136. In FIG. 6, water-absorbent powder particles 136 are applied to the interior and exterior of the extrudate cone of the binder film 126. Residual powder particles may pass through gaps between the core elements 114 to the central strength member 124 where the powder particles may be captured by the tubes 116 and other interior surfaces of the core 112.

Use of a binder film 126, as disclosed herein, may permit continuous or near-continuous cable 110, 210 production, may eliminate binder yarn indentations on core elements 114, may remove cable binding as a production speed constraint, may permit stranding to be speed matched with jacketing, may contribute to the strength of the jacket 134, may replace water-blocking tape, may eliminate the associated tape inventory and the tape-width inventory subset, may allow access by ripcord 142 to the core elements 114 (where binder yarns generally cannot be cut by the ripcord, as discussed), may provide significant cost savings in materials, and/or may allow for removal of water-blocking yarn wrapped around the central strength member in some conventional cables.

In alternate contemplated embodiments of the above-disclosed cables 110, 210 and manufacturing methods 310 and equipment, a capstan may be used in place of the caterpuller 320. In some embodiments, water-absorbent powder 136 may not be applied to the exterior of the binder film 126, and a water bath may be used to increase the cooling rate. Further, the caterpuller 320 or at least a portion thereof may be submerged in the water bath. In some embodiments, water-absorbent powder 136 may not be applied to the interior surface of the binder film 126, or to either the interior or the exterior surfaces of the binder film 126. Thermoplastics and/or materials other than polyethylene may be used to form the binder film 126. The binder film 126 may be of various colors, and may have UV stabilizers that permit the binder film 126 as the exterior of a finished outdoor product. The binder film 126 may be printed upon. The binder film 126 may include tear features 140, such as those as disclosed herein with regard to the jacket 134. In some embodiments, the binder film 126 may surround a broad range of different types of stranded cable components, such as S-Z stranded tight-buffered fibers, filler rods, fiberglass yarns, aramid yarns, and other components.

FIG. 7 shows a polypropylene extrusion cone 412 projecting from a crosshead 414 and drawing down over a core 416 of stranded elements during manufacturing of a cable 418. As shown, the extrusion cone 412 draws down to a thickness of about 0.11 mm (or less) and the line speed is about 50 meters per minute (or faster) with a crosshead 414 temperature of about 210° C. According to an exemplary embodiment, the polypropylene of the extrusion cone 412 includes a nucleator to facilitate fast recrystallization of the polypropylene. For example, the polypropylene of the extrusion cone 412 is believe to recrystallize at a temperature at least 20° C. higher than high-density polyethylene, and with requiring roughly up to one-third less energy to extrude than high-density polyethylene.

Figure 8:
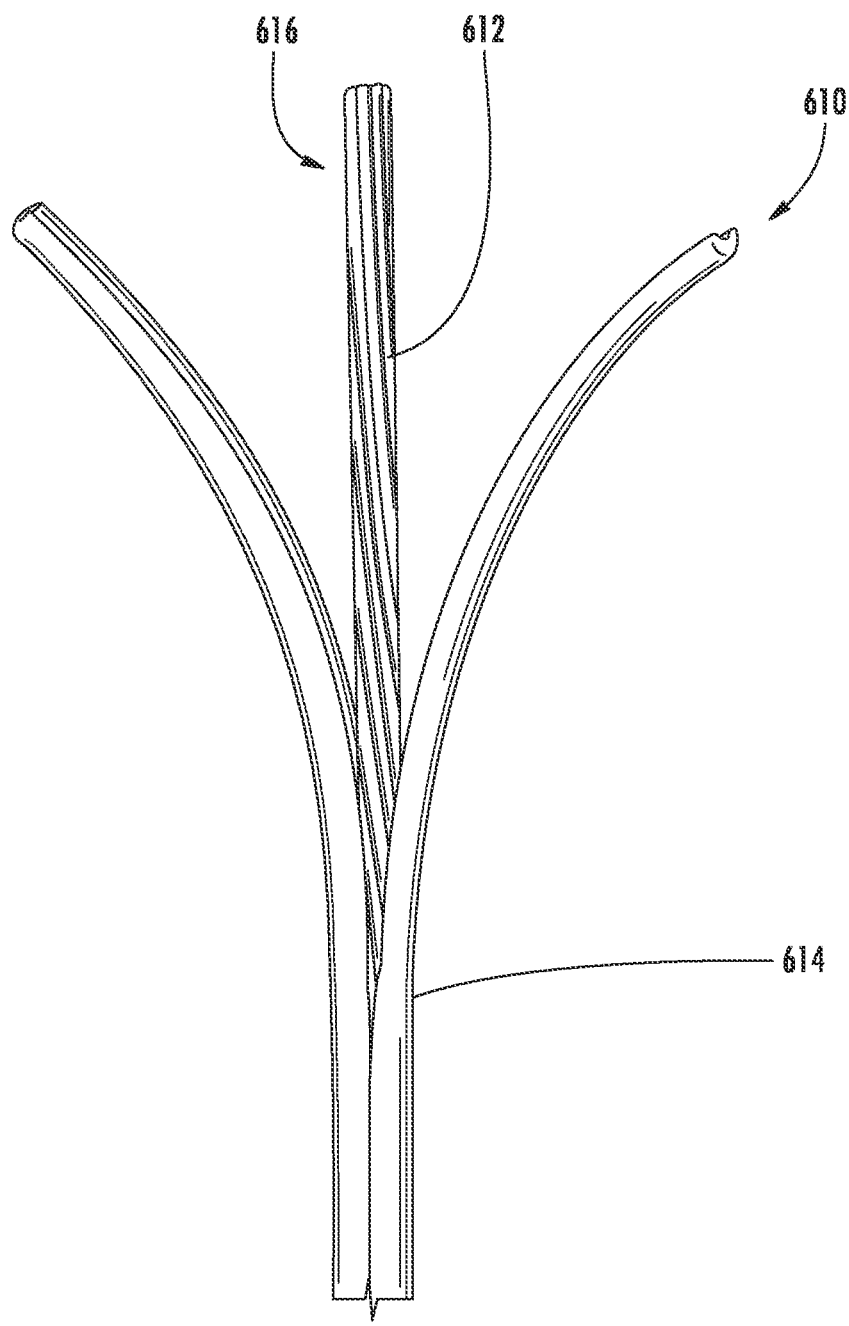
FIG. 8 is a digital image of a fiber optic cable having a core of stranded elements bound by the binder film of FIG. 7 in a jacket according to an exemplary embodiment.

Referring to FIG. 8, a stranded core 612 of a cable 610 extends from a jacket 614 of the cable 610. The core 612 includes a reversal 616 in the strand direction, and the core 612 is bound by a binder film 126 as disclosed herein. The jacket 614 is polymeric (e.g., includes polyvinyl chloride, polyethylene, and/or other materials). According to an exemplary embodiment, the cable 610 includes a dielectric armor layer beneath the jacket 614, between the jacket 614 and the core 612 (see also FIG. 3).

Figure 9:
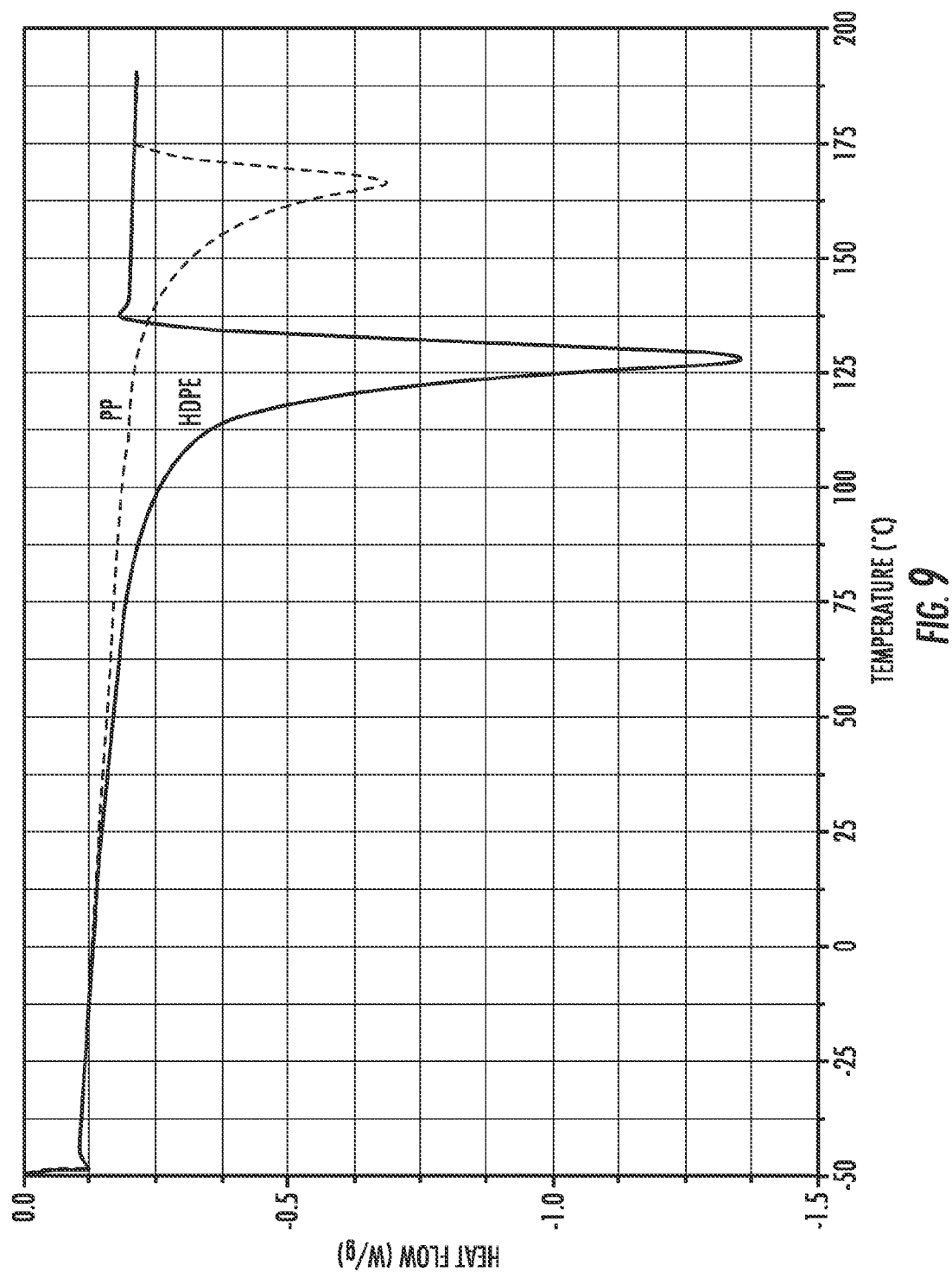
FIG. 9 is a graphical representation of heat flow versus temperature for polyethylene and polypropylene samples.

Referring now to FIG. 9, a graphical representation via differential scanning calorimetry compares the heat flow of two different potential materials for the binder film 126: high-density polyethylene (labeled "HDPE" in FIG. 9; e.g., Dow 7590 HDPE natural pellet) and polypropylene (labeled "PP" in FIG. 9; e.g., INEOS N05U-00 PP natural pellet). The graphical representation shows that the polypropylene "melting point" is closer to (e.g., within 50° C.; within 30° C.) the processing/extrusion temperature (e.g., about 200-230° C.±20° C.), which is useful for quickly solidifying the binder film 126 (i.e., less change in temperature is required to achieve solidification after extrusion), such that the binder film 126 contracts while the stranded elements 114 are constrained by the caterpuller 320 so that the binder film 126 loads the stranded elements 114 in compression with the central strength member 124 providing a coupling force therebetween that prevents the formation of "bird cages."

According to an exemplary embodiment, the material of the binder film 126 may be selected such that the melting temperature of the material of the binder film 126 is less (e.g., at least 30° C. less, at least 50° C. less) than the extrusion temperature (e.g., about 200-230° C.±20° C.) of a jacket 134 (see FIG. 1) that is subsequently extruded over the binder film 126. In some such embodiments, the binder film 126 melts or blends into the jacket 134. In other embodiments, the binder film 126 maintains separation from the jacket 134 by intermediate material, such as super-absorbent polymer particles. Applicants theorize that a reason the stranded elements 114 do not migrate axially or outwardly during extrusion of the jacket 126, while melting or softening of the binder film 126, is that, by the time of subsequent extrusion of the jacket 126 (e.g., at least 2 seconds following stranding and application of the binder film 126, at least 5 seconds, at least 10 minutes), the stranded elements 114 have sufficiently conformed to the geometry of the stranding pattern due to stress relaxation of the materials of the stranded elements 114, reducing spring forces initially carried by the stranded elements 114 upon stranding; and Applicants theorize that the jacket 134 positively contributes to radial tension applied by the binder film 126 to constrain and normally load the core elements 114 to the central strength member 124.

Further, Applicants have found that application of the binder film 126 at extrusion temperatures above the melting temperature of the stranded elements 114 (e.g., at least 30° C. above, at least 50° C. above) does not melt or substantially deform the stranded elements 114. As such, the binder film 126 may include the same or similarly-melting polymers as buffer tubes 116, 116' stranded in the core 112, such as polypropylene. Further, Applicants have found very little or no sticking between the binder film 126 and buffer tubes 116, 116' stranded in the core 112, presumably due to the rapid cooling techniques disclosed herein, such as actively directing a flow of cooling air, caterpuller 320 in a water bath, thin film layer, binder film material selected for solidification/crystallization temperatures of the binder film 126 close to the extrusion temperature, and/or other techniques.

Further, the graphical representation in FIG. 9 may be interpreted to predict the draw-down ratio of the extrudate material forming the binder film 126. Applicants believe that the relationship is such that smaller the area under the curve, the higher the crystallinity and therefore the higher the required draw-down ratio. In general polyethylene is more crystalline than polypropylene, and high-density polyethylene is more crystalline than low-density polyethylene.

From a different perspective, the effectiveness of a material for the binder film 126 may be related to temperature of crystallization, at which crystals start growing and therefore mechanical properties start developing. It is Applicants' understanding that the temperature of crystallization is around 140° C. for nucleated polypropylene (e.g., N05U-00), while the temperature of crystallization is at a lower temperature for high-density polyethylene (e.g., 7590), such as less than 125° C. Applicants theorize that materials that crystallize at higher temperatures will lock down faster and may work better for binder film 126 applications as disclosed herein (i.e. such materials apply more radial force to the core 112 earlier).

Further, it is Applicants' understanding that, to some degree, draw-down of the materials continues until the glass-transition temperature is reached. In the case of polypropylene, glass-transition temperature may be reached about $^{-}10°$ C. and for polyethylene $^{-}70°$ C. (but may be as high as $^{-}30°$ C.). Accordingly, such low temperatures will not likely be reached in processing/manufacturing, so the binder film 126 may actively continue to shrink post-processing (until glass-transition temperatures are reached), which may further improve coupling between the stranded elements 114 and the central strength member 124. For other possible binder film materials, such as polybutylene terephthalate, with a glass-transition temperature of about 50° C., the normal force applied to the stranded elements may be less because the binder film 126 may stop actively shrinking or having a bias to shrink.

Further, Applicants have found that the greater strength of polypropylene relative to polyethylene allows the binder film 126 to be thinner for a polypropylene binder film 126 to provide the same amount of coupling force between the stranded elements 114 and the central strength member 124. For example, a 0.15 mm binder film 126 of polyethylene was found to have about a 70 N radial force, while a 0.15 mm binder film 126 of polypropylene had about an 85 N radial force. However, polyethylene is typically considerably less expensive than polypropylene, and in other embodiments, polyethylene may be used for the binder film 126.

In some embodiments, the binder film 126 is formed from a first material and the jacket 134 is formed from a second material. The second material of the jacket 134 may include, such as primarily include (>50% by weight), a first polymer such as polyethylene or polyvinyl chloride; and the first material of the binder film 126 may include, such as primarily include, a second polymer, such as polypropylene. In some embodiments, the first material further includes the first polymer (e.g., at least 2% by weight of the first material, at least 5% by weight, at least 10% by weight, and/or less than 50% by weight, such as less than 30% by weight). Inclusion of the first polymer in the first material of the binder film 126, in addition to primarily including the second polymer in the first material, may facilitate bonding between the first and second materials so that the binder film 126 may be coupled to the jacket 134 and automatically removed from the core 112 when the jacket 134 is removed from the core 112, such as at a mid-span access location.

Figure 10:
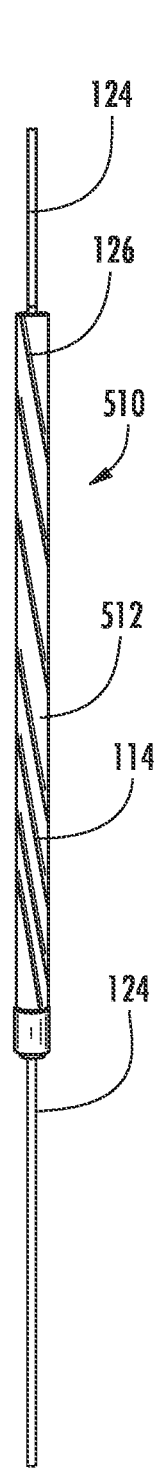
FIG. 10 is a digital image of a sample of stranded elements bound around a central strength member, with the central strength member projecting from ends thereof so that the sample is configured for a pull-through test to measure coupling force, according to an exemplary embodiment.
Figure 11:
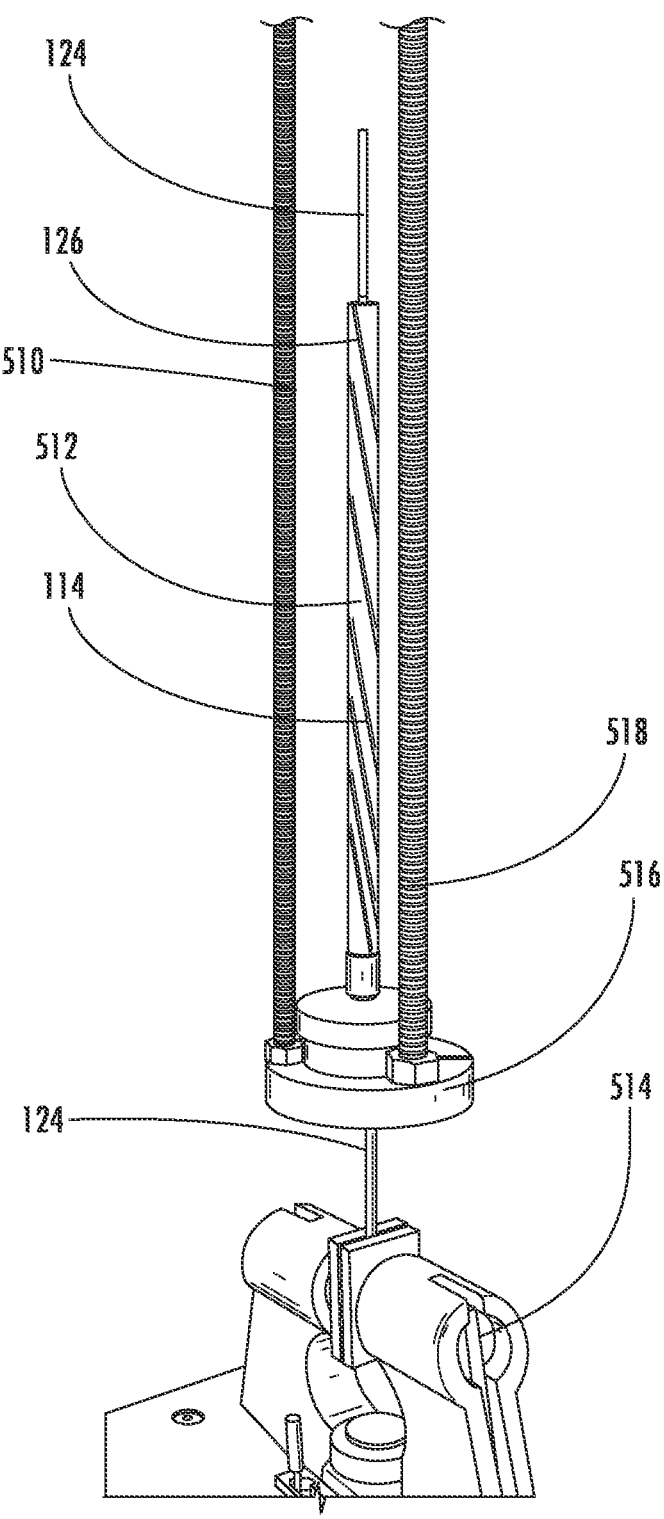
FIG. 11 is a digital image of the sample of FIG. 10 in a pull-through test rig, with the central strength member fixed in a clamp and a tensile test apparatus configured to pull the stranded elements axially upward relative to the central strength member to determine the coupling force, according to an exemplary embodiment.

FIGS. 10-11 show a sample 510 of a core 512 of stranded elements 114 within a binder film 126 that is configured for a pull-through test to determine the coupling force between the stranded elements 114 and the central strength member 124. As shown in FIG. 10, the central strength member 124 extends from the stranded elements 114 by a distance of about 50 mm.

As shown in FIG. 11, the extended portion of the central strength element 124 is held fixed with a clamp 514. A plate 516 with an opening just wide enough for the central strength member is attached to a tensile test apparatus 518 so that as the apparatus 518 lifts the plate 516, and the plate 516 pushes the stranded elements 114 along the central strength member 124. Applicants have found that the binder film 126, as disclosed herein, results in a (net) static friction force between the stranded elements 114 and the central strength member 124 of at least 10 N for a 100 mm length of stranded elements, such as at least 15 N.

Via pull-through testing, Applicants have found that the magnitude of the static friction force is related to the thickness of the binder film 126. For a polypropylene binder film 126 of at least 0.02 mm but less than 0.04 mm in average wall thickness, the static friction force for a 100 mm section of stranded elements 114 (without a jacket) is at least 10 N, such as about 12.4 N, and/or the average static friction force for a 200 mm section of stranded elements 114 is at least 20 N, such as about 23.1 N. Accordingly, for such a binder film 126, the reverse-oscillatory stranding pattern must be such that the net spring force of the stranded elements 114 is about 10 N or less for a 100 mm section to prevent axial migration of the stranded elements 114 and formation of a "bird cage" during manufacturing. Applicants have also found, for a polypropylene binder film 126 of at least 0.08 mm but less than 0.15 mm in average wall thickness, the average static friction force for a 100 mm section of stranded elements is at least 20 N, such at least 30 N, and/or the average static friction force for a 200 mm section of stranded elements is at least 40 N, such as at least 50 N. Some testing included stranded elements bound by both binder film 126 and binders yarns to determine the contribution of the binder film 126.

Figures 12, 13:
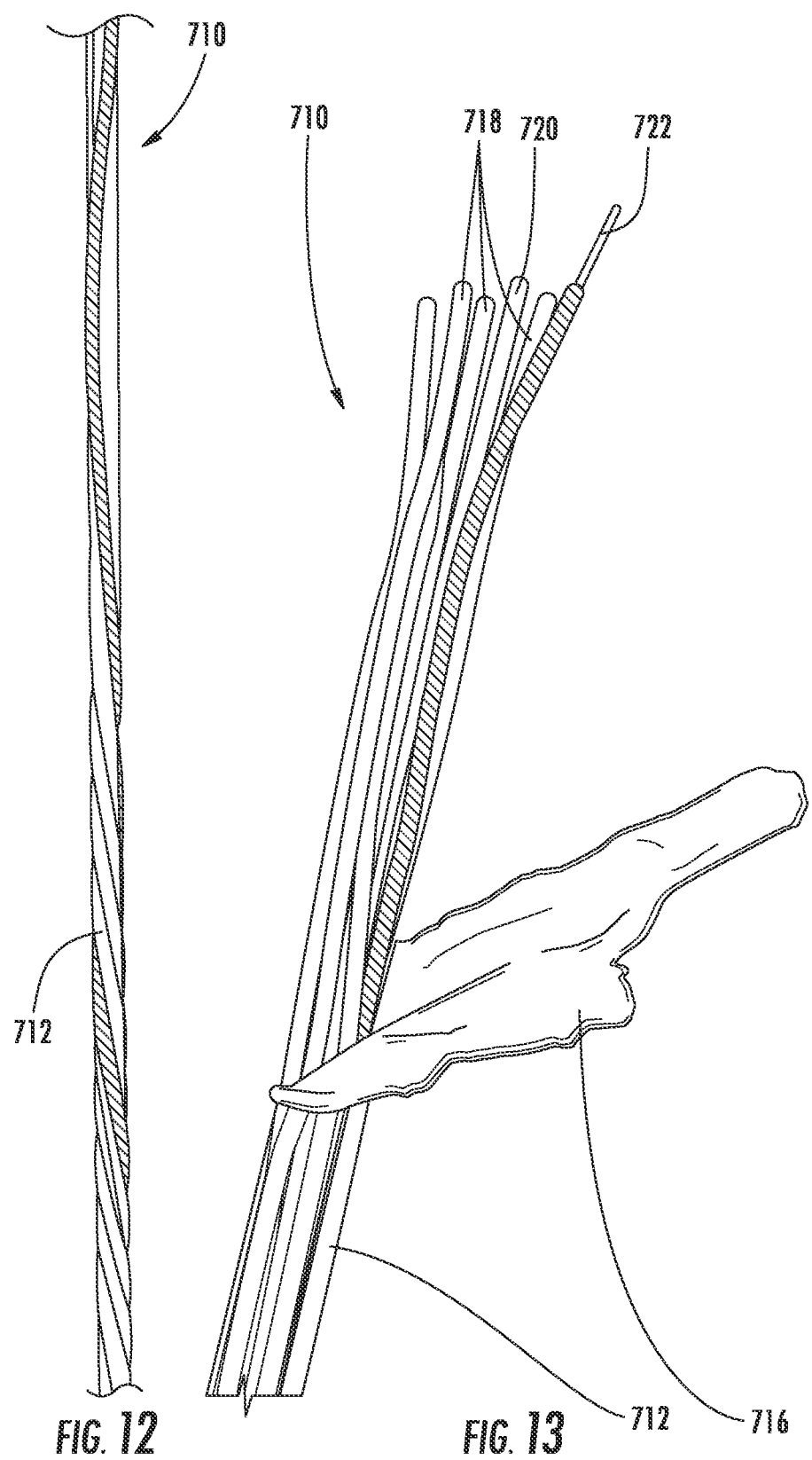
FIG. 12 is a digital image of a core of stranded elements bound by a binder film according to another exemplary embodiment.
FIG. 13 is a digital image of the core of FIG. 12 with the binder film torn away from an end of the core to release the stranded elements and the central strength member according to an exemplary embodiment.

Referring to FIGS. 12-13, a stranded core 712 of a cable 710 includes a binder film 716 that constrains the stranded elements 718 having a reversal 714. In some embodiments, the core 712 may be enclosed within a jacket (see FIG. 8). As shown in FIG. 13, the binder film 716 is a thin polymeric material (e.g. polypropylene, polyethylene), which can be torn and peeled back by hand to provide access to the stranded elements 718 and central strength member 720. Once released from the binder film 716, the stranded elements 718 may decouple from the central strength member 720, as shown in FIG. 13. Optical fibers 722 extend from the end of one of the stranded elements 718, which is a buffer tube 724 (e.g., including polypropylene). The other stranded elements 718 in FIG. 13 are "dummy" tubes or solid polymeric rods that fill positions in the strand.

FIGS. 14-15 show another advantage of the binder film 716 is that stranded elements 718 can be accessed by opening the binder film 716, but without severing and/or removing lengthwise tension in the binder film 716. As shown in FIG. 14, a lengthwise incision 726 is formed in the binder film 716, which may be guided by an interstice (i.e., open space, gap, groove) between stranded elements 718. Due to the thinness of the binder film 716, the incision 726 can be made without specialize tools. For example, the incision 726 shown in FIG. 14 was cut with scissors. A razor blade, key, pocket knife or other common tools may also work.

The lengthwise incision 726 provides an opening through which the stranded elements 718 can be unwound at a reversal 714 to provide extra length for handing the stranded elements 718, and one or more of the elements 718 may be tapped at the mid-span location. For example, FIG. 15 shows one of the elements 718 (buffer tube 724) has been cut and pulled out of the opening formed by the incision 726 so that optical fibers 728 of the element 718 can be accessed. At the same time, the rest of the binder film 716 holds together and maintains tension forward and rear of the incision 726 along the length of the cable 710. Once access is no longer needed, the opening can be taped, shrink wrapped, or otherwise secured and resealed. By contrast, binder yarns may need to be fully severed to access the stranded elements, releasing tension in the binder yarns.

As mentioned above, the material of the binder film 716 may be selected so that the binder film 716 is at least partially translucent, as shown in FIGS. 11-15. For some embodiments, the jacket (e.g., jacket 614 as shown in FIG. 8) may be pulled back or be otherwise removed, with the binder film 716 intact. A reversal point in the strand can be easily located through such a binder film 716, which can then be accessed, as shown in FIGS. 14-15.

The buffer tubes 116, 724 disclosed herein may include polypropylene, polyvinyl chloride, polycarbonate, polybutylene terephthalate, and/or other polymers. Fillers, additives, and other components may be added to the polymers. In some embodiments, in addition to the optical fibers 728, the buffer tubes 116, 724 are filled with a filling compound, such as a grease or petroleum-based gel. The filling compound water-blocks the buffer tubes 116, 724 and provides coupling between the optical fibers 728 and the buffer tubes 116, 724. In other embodiments, the buffer tubes 116, 724 are "dry" and are free of filling compound, as discussed above. In such embodiments, the buffer tubes 116, 724 may be water-blocked by water-swellable powder, such as super-absorbent polymer, which may be impregnated in a yarn extending through the cavity of the buffer tubes 116, 724 and/or the powder may be mechanically attached to the interior of the buffer tube 116, 724, as discussed above.

According to an exemplary embodiment, the buffer tubes 116, 724 have an outer diameter that is 3 millimeters or less, such as 2.5 millimeters or less, or even 2 millimeters or less. The buffer tubes 116, 724 may have an average wall thickness of at least 100 micrometers, such as at least 200 micrometers, and/or less than a millimeter. As the number of optical fibers 728 increases for the same size buffer tube 116, 724, the freedom of the optical fibers 728 therein to bend and have excess optical fiber length decreases. Each buffer tube 116, 724 may include at least one optical fiber 728, such as at least four optical fibers 728, such as at least twelve optical fibers 728. Dummy rods may replace one or more of the buffer tubes 116, 724, as discussed above.

According to an exemplary embodiment, the optical fibers 728 include a glass core immediately surrounded by a glass cladding, which is immediately surrounded by one or more layers of a polymer coating, such as softer, stress-isolation layer of acrylate immediately surrounded by a harder shell of acrylate. According to an exemplary embodiment, the optical fibers 728 are individual, discrete optical fibers, as opposed to optical fibers of a fiber optic ribbon. In other embodiments, ribbons and/or stacks of ribbons are included. The optical fibers 728 may be single mode optical fibers, multi-mode optical fibers, multi-core optical fibers, plastic optical fibers, optical fibers having a uniform cladding, and/or other types.

The optical fibers 728 may be bend-resistant optical fibers having a cladding that includes annular layers of differing refractive indices or other types of bend-resistant optical fibers. An example of a bend-insensitive, or bend resistant, optical fiber is ClearCurve® Multimode fiber commercially available from Corning Incorporated of Corning, N.Y. In some such embodiments, when bent into a coil having a single turn with a diameter of about 200 millimeters, the optical fibers 728 have a change in optical attenuation (delta attenuation) at 1310 nanometers of about 0.1 dB or less per turn, and more preferably about 0.03 dB or less per turn, where the above delta attenuation is observed at one or wavelengths preferably greater than or equal to 1500 nm, in some embodiments also greater than about 1310 nm, in other embodiments also greater than 1260 nm. Use of bend-resistive optical fibers may facilitate improved optical performance of the associated cable, such as when the cable is stretched.

Lay length of the stranded buffer tubes 116, 724 is discussed above. In some embodiments, the lay length is particularly short, such as less than 1 meter along the length of the respective cable between reversals in a reverse oscillatory stranding pattern, such as less than 750 mm, such as less than even 500 mm in some embodiments. Between the reversals in at least some such stranded arrangement, the buffer tubes 116, 724 include at least 2 full turns (i.e. complete spirals) around the central axis of the strand, such as at least 3 full turns, and/or eve at least 4 full turns. The tightness of the stranding pattern relates to the loading required by the respective binder film 126, 716. In general, tighter the lay pattern, the greater the torsional loading of the buffer tube 116, 716 away from the central axis of the strand (e.g., central strength member) at the reversals. For example, embodiments disclosed herein may achieve the above-described coupling to the central strength member while undergoing such tight lay patterns.

Figure 16:
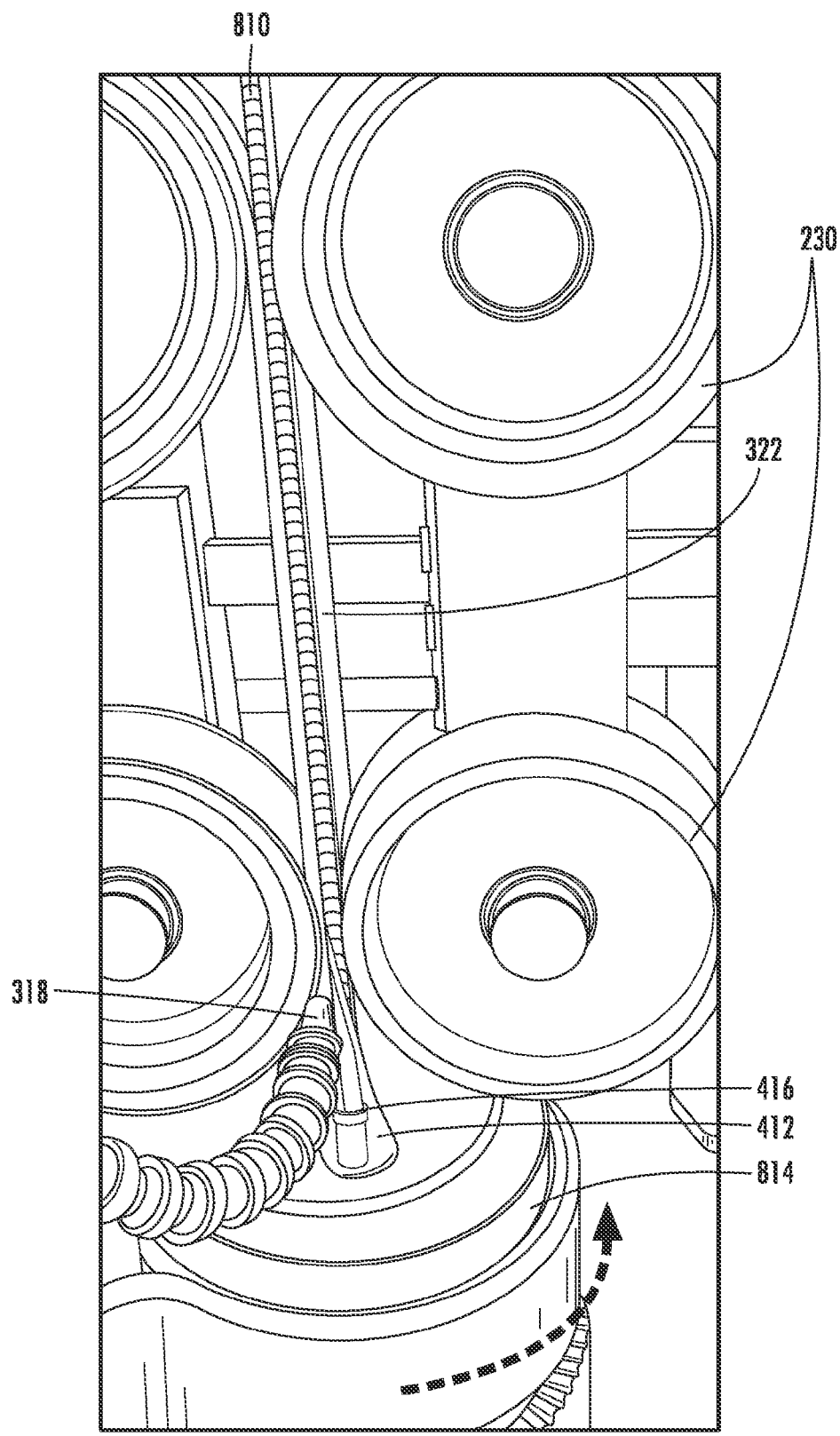
FIG. 16 is a perspective view of a binder film being extruded around a core of stranded elements according to another exemplary embodiment.

Referring now to FIG. 16, a manufacturing line, similar to that disclosed and discussed above with regard to FIGS. 4-7, includes a rotating extruder. The rotating element of the extruder may the cross-head 814, where the extrusion cone 412 projecting from a crosshead 814 twists while drawing down over the core 416. In other embodiments, the die and/or other elements of the extruder rotate. Twisting of the extrusion cone 412 as the extrusion cone 412 draws down over the core 416 is intended to increase the rate at which the extrusion cone 412 draws down and/or to increase the inward radial tension applied by the corresponding binder film 126, 716. Rotating extruder components are commercially available from A.R. Eng. Machine Inc., Akron Tool & Die Co., Inc., Ruian Devry Machinery Co., Ltd., and/or other manufacturers.

According to an exemplary embodiment, the extrusion cone 412 is twisted by the rotating extruder at a generally constant rate and in the same helical direction, regardless of the underlying stranding of buffer tubes 116, 716 or other stranded elements. The rotating extruder provides a twist that may be visible in the form of striations and stretch markings in the corresponding binder film 126, 716. The lay length of the twist may be less than 2 meters, such as less than 1.5 meters. In some contemplated embodiments, the lay length of the twist of the binder film 126, 716 is very short, such as less than 500 mm, such as even less than 300 mm. The bound core 810 is similar to the bound core 410 of FIG. 7, except with the binder film 126, 716 surrounding the core 810 having a twist, as shown in FIG. 16.

In some embodiments, the rotating extruder twists the binder film 126, 716 in a manner coordinated with rotation of the stranded elements, such as reverse-oscillatory stranded buffer tubes 116, 716. In some embodiments, the reverse-oscillatory pattern of the rotating extruder matches the pattern of the stranded elements, but in reverse such that the binder film 126, 716 twist opposes the twist of the stranded elements between the reversals. In some such embodiments or in other embodiments, the reverse-oscillatory pattern of the rotating extruder again matches the pattern of the stranded elements in terms of lay length and distance between reversals, but is offset lengthwise from the pattern of the stranded elements so that twisting of the binder film 126, 716 occurs over the reversals of the underlying stranded elements.

The construction and arrangements of the cables, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, in some embodiments, cables include multiple layers or levels of core elements stranded around a central strength member 124, where each layer includes a binder film 126 constraining the respective layer and where binder film 126 of the outer layer(s) indirectly surrounds the binder film 126 of the inner layer(s). In contemplated embodiments, the binder film 126 is not extruded, but is formed from laser-welded tape and/or a heat shrink material, for example. Some elements shown as integrally formed may be constructed of multiple parts or elements, the position of elements may be reversed or otherwise varied, and the nature or number of discrete elements or positions may be altered or varied. In some contemplated embodiments, the binder film 126 with water-blocking powder, as disclosed herein, may function as an extruded water-blocking element, thereby allowing for continuous cable manufacturing without replacing reels of the water-blocking tape; which, for example, may block water between armor (or other outer layers in a cable 210) and a core 112, such as a core of stacked fiber optic ribbons or a mono-tube core, or between other components in a cable. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A fiber optic cable, comprising:
   core elements stranded around a central strength member in a pattern of stranding including reversals in lay direction of the core elements, the core elements comprising:
   a buffer tube surrounding optical fibers; and
   one or more additional core elements, comprising at least one of:
   a filler rod, and
   an additional buffer tube;

a binder film surrounding the stranded core elements, wherein the binder film is twisted around the core elements; and a jacket surrounding the binder film, wherein the jacket is at least five times thicker than the binder film, wherein at least 50 percent by weight of the binder film is a polymer with a sub-zero degrees Centigrade glass-transition temperature, whereby the binder film may actively continue to shrink post-processing, facilitating coupling between the core elements and the central strength member.

2. The fiber optic cable of claim 1, wherein the twist of the binder film is in a repeating pattern.

3. The fiber optic cable of claim 2, wherein the repeating pattern of the twist of the binder film is generally helical and has a lay length of less than 2 meters.

4. The fiber optic cable of claim 2, wherein the repeating pattern of the twist of the binder film includes reversals.

5. The fiber optic cable of claim 4, wherein the repeating pattern of the twist of the binder film matches the pattern of stranding of the stranded core elements but is offset lengthwise so that the binder film twists around reversals of the pattern of stranding of the core elements.

6. The fiber optic cable of claim 4, wherein the repeating pattern of the twist of the binder film matches the pattern of stranding of the stranded core elements in lay length and location of reversals but is opposite in direction to the pattern of stranding of the stranded core elements.

7. The fiber optic cable of claim 1, further comprising water-absorbing powder particles partially embedded in the binder film such that the water-absorbing powder particles have a portion thereof submerged in the binder film and another portion thereof exposed, wherein at least some of the water-absorbing powder particles are positioned on an inside surface of the binder film between the binder film and the core elements.

8. The fiber optic cable of claim 7, wherein the binder film is 0.2 millimeters or less in thickness.

9. The fiber optic cable of claim 1, wherein the polymer has a Young's modulus of 3 gigapascals or less.

10. The fiber optic cable of claim 1, wherein the jacket is at least ten times as thick as the binder film.

11. The fiber optic cable of claim 10, wherein greater than 50 percent by weight of the jacket consists of polyethylene, and wherein the binder film comprises polyethylene.

12. The fiber optic cable of claim 11, wherein the jacket and the binder film are bonded together, whereby the binder film may be automatically removed from the core when the jacket is removed.

13. A method of manufacturing a fiber optic cable, comprising
steps of:
stranding core elements around a central strength member in a pattern of stranding with a stranding machine on a manufacturing line, the core elements comprising:
a buffer tube surrounding optical fibers; and
one or more additional core elements, comprising at least one of:
a filler rod, and
an additional buffer tube;
extruding a binder film to surround the core elements after stranding the core elements such that the extruding takes place along the manufacturing line; and
rotating an extrudate cone of the binder film during the extruding to form a twist in the binder film about the core elements, whereby the extrusion cone quickly draws down onto the core elements.

14. The method of claim 13, wherein the pattern of stranding of the core elements includes reversals in lay direction, the method further comprising a step of constraining the stranded core elements while the binder film cools and contracts around the core elements.

15. The method of claim 14, wherein a caterpuller is used for the constraining step, wherein the caterpuller is positioned along the manufacturing line within a distance of at least ten lay lengths of the strand from the stranding machine.

16. The method of claim 14, wherein a caterpuller is used for the constraining step, wherein the caterpuller is located along the manufacturing line within 100 mm from the closing point where the core elements come together at the trailing end of the stranding machine.

17. The method of claim 14, wherein a caterpuller is used for the constraining step, the method further comprising a step of imparting compressive forces on the binder film via the caterpuller that somewhat flatten portions of the binder film such that the somewhat flattened portions are at least 20% thinner than the average thickness of the binder film.

18. The method of claim 13, further comprising a step of actively cooling the binder film to hasten contraction of the binder film around the stranded core elements prior to the binder film and core elements exiting the caterpuller.

19. The method of claim 13, wherein the stranding step includes using an oscillating nose piece of a stranding machine extending through a crosshead of an extruder into a space surrounded by the extrudate cone of the binder film.

* * * * *